US008868025B2

(12) United States Patent
Ganesh et al.

(10) Patent No.: US 8,868,025 B2
(45) Date of Patent: Oct. 21, 2014

(54) METHODS, SYSTEMS AND DEVICES FOR PRIORITIZING ACCESS TO WIRELESS NETWORKS

(75) Inventors: Shriram Ganesh, San Diego, CA (US); Babak Forutanpour, Carlsbad, CA (US); Andrew J. Everitt, Cambridge (GB); Pramod V. Argade, San Diego, CA (US); Gerald P. Joyce, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 13/585,522

(22) Filed: Aug. 14, 2012

(65) Prior Publication Data

US 2014/0051379 A1 Feb. 20, 2014

(51) Int. Cl.
*H04M 11/04* (2006.01)
*H04W 4/22* (2009.01)
*H04M 1/725* (2006.01)

(52) U.S. Cl.
CPC ............ *H04W 4/22* (2013.01); *H04M 1/72538* (2013.01)
USPC ...................................................... 455/404.1

(58) Field of Classification Search
USPC .......... 455/404.1–404.2, 418–420, 573–574, 455/550.1, 422.1, 414.1
See application file for complete search history.

(56) References Cited

U.S. PATENT DOCUMENTS

| 6,421,009 B2* | 7/2002 | Suprunov ...................... 342/465 |
| 7,725,094 B2* | 5/2010 | Chary ......................... 455/343.5 |
| 2007/0123286 A1 | 5/2007 | Mock et al. |
| 2007/0139182 A1 | 6/2007 | OConnor et al. |
| 2008/0057894 A1 | 3/2008 | Aleksic et al. |
| 2009/0143046 A1 | 6/2009 | Smith |
| 2010/0151814 A1 | 6/2010 | Bragg |
| 2011/0124312 A1* | 5/2011 | Kwon et al. ................ 455/404.2 |
| 2011/0159839 A1 | 6/2011 | McEwen et al. |
| 2011/0189972 A1* | 8/2011 | Sato et al. .................. 455/404.1 |
| 2012/0064855 A1* | 3/2012 | Mendelson ................ 455/404.2 |

FOREIGN PATENT DOCUMENTS

| GB | 2440380 A | 1/2008 |
| WO | 2010017314 A1 | 2/2010 |
| WO | WO2010/017314 A1 * | 2/2010 ............. H04W 4/22 |
| WO | 2011060140 A1 | 5/2011 |

OTHER PUBLICATIONS

International Search Report and Written Opinion—PCT/US2013/054556—ISA/EPO—Oct. 23, 2013.

* cited by examiner

*Primary Examiner* — Brandon Miller
(74) *Attorney, Agent, or Firm* — James T. Hagler

(57) ABSTRACT

Methods, devices and systems enable prioritizing mobile device access to a communication network during periods of reduced network availability, such as during emergency situations. The mobile device may be configured to detect the existence of an emergency situation locally, on the mobile device. Upon recognizing an emergency situation the mobile device may collect information from various components and/or sensors of the mobile device. Using the collected information, the mobile device may compute a priority for accessing the communication network. Using the computed priority, the mobile device may attempt to access the communication network in a manner that staggers access attempts among all mobile devices to reduce network congestion.

85 Claims, 17 Drawing Sheets

METHODS, SYSTEMS AND DEVICES FOR PRIORITIZING ACCESS TO WIRELESS NETWORKS

BACKGROUND

Cellular and wireless communication technologies have seen explosive growth over the past several years. Cellular service providers now offer a wide array of features and services that provide their users with unprecedented levels of access to information, resources and communications. To keep pace with these service enhancements, mobile electronic devices (e.g., cellular phones, tablets, laptops, etc.) have become more feature rich, and now commonly include global positioning system (GPS) receivers, sensors, and many other components for connecting users to friends, work, leisure activities and entertainment. As a result of these improvements, mobile devices (e.g., smart phones, tablets, etc.) have become ubiquitous, and mobile device users now expect to have access to content, data and communications at any time, in any place.

Cellular communication networks are designed to accommodate access requests from only a fraction of the total number of wireless devices in a particular cell. At times of emergency or crisis, network resources may become overtaxed when predictable human responses to the situation prompt an extraordinary number of wireless device users within a particular cell to access the network at the same time. Wireless device users may be attempting to alert emergency personnel of the emergency situation (such as a 911 emergency call) or to alert friends or family members that the user is safe despite being in the area of an emergency situation. Some users may be transmitting images of the emergency condition (fire, accident, etc.) to news services or friends. The predictable increase in call volume during an emergency situation can overwhelm a commercial cellular communications network, particularly in the cell zone encompassing the emergency, causing service outages and/or long wait times. Consequently, the efficient detection of emergency situations (or other events that causes cellular service to be limited or overwhelmed) and the prioritization of access to telecommunication networks during such emergencies is an important and challenging design criterion for cellular service providers, network engineers, and mobile device designers.

SUMMARY

The various embodiments provide systems, devices, and methods encompassing mobile electronic devices configured to prioritize access to a communication network during an emergency. The mobile devices may be configured to recognize when an emergency situation exists, and make intelligent network access priority and battery usage decisions based on situational information collected by the mobile device at the time of the emergency. The mobile devices may self-allocate, self-administer, and/or self-enforce the network access priorities, which may indicate time windows and limited durations during which the mobile device is allowed to access the network. Mobile device users determined to be most likely in need of help or immediate access based on the collected situations information may be allocated a higher priority, or longer or more frequent time windows, for accessing the communication network.

In an embodiment, the mobile devices may be configured to automatically disable non-essential applications and polling operations, halt background processes, dim the screen, and/or perform other similar power saving operations in response to detecting the emergency situation.

In an embodiment, the mobile devices may be configured to automatically establish peer-to-peer connections with other mobile devices in response to detecting the emergency situation. These peer-to-peer connections may be used to communicate with the other mobile devices to confirm the likelihood of the existence of an emergency, or to the network connectivity of another mobile device to communicate with the communication network.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
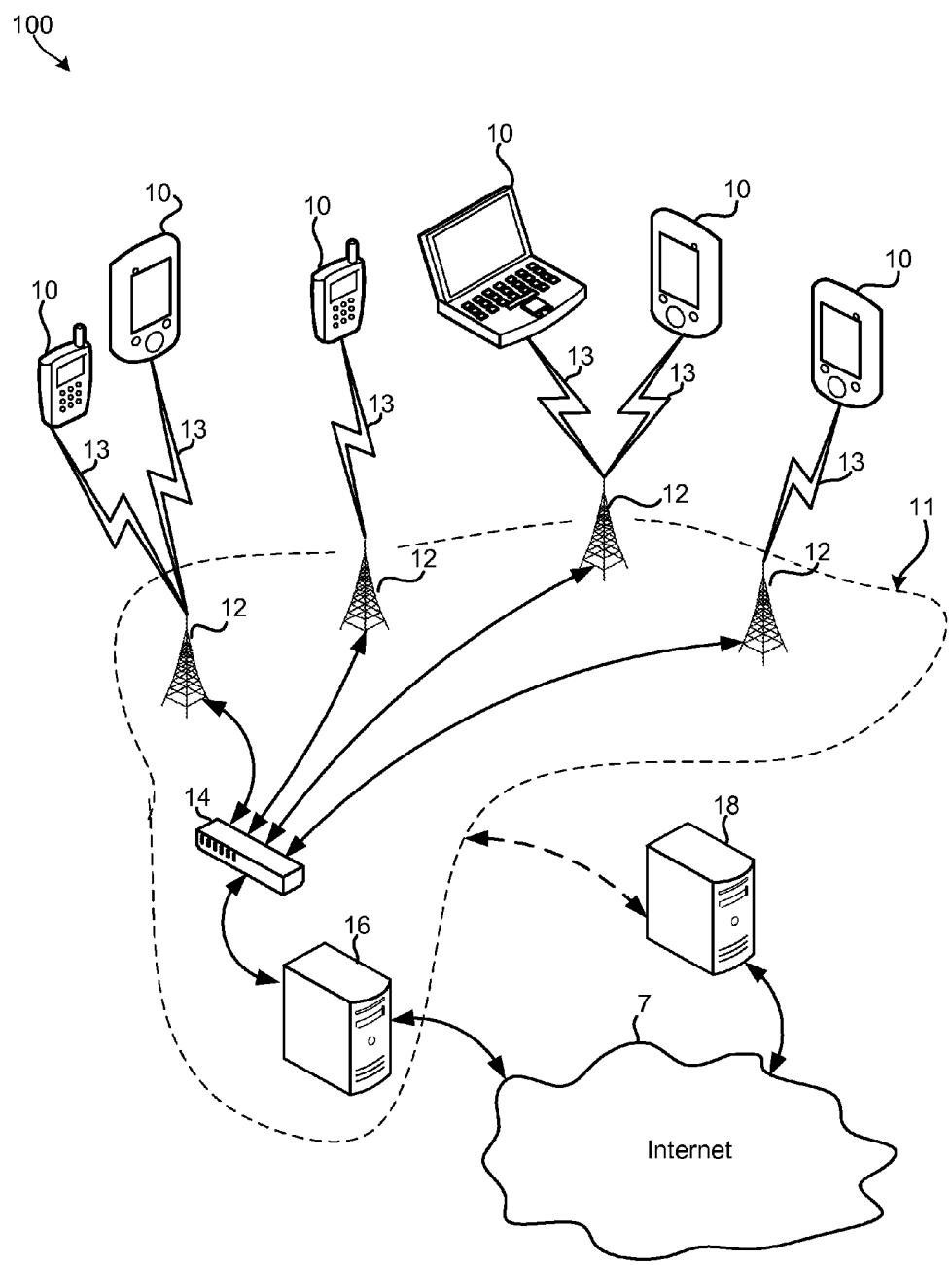
FIG. 1 is a communication system block diagram illustrating network components of an example telecommunication system suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," and "computing device" are used interchangeably herein to refer to any one or all of cellular telephones, smartphones, personal or mobile multimedia players, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While the various embodiments are particularly useful in mobile devices, such as cellular telephones, which have limited battery life, the embodiments are generally useful in any computing device that may be used to wirelessly communicate information during an emergency.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

In emergency or disaster situations (both natural and man-made), it is often paramount to maintain communications among first responders, command and control authorities, victims, and ordinary citizens who may be endanger or able to assist. Without effective communications first responders may not be effectively mobilized to the areas which need the most assistance, victims may not be identified or able to call for help, and government and utility services may be slow to respond.

With the ubiquity of wireless device ownership and usage, communication via cell phones, smart phones and similar wireless devices using commercial cellular communication networks often are the most efficient and effective means for citizens and authorities to communicate during an emergency. Fire, rescue, and government services may use the cellular communication networks in addition to or in place of their own radio networks. Ordinary citizens may use their mobile devices to call for assistance (e.g., when they are injured or immobile), reassure friends and family, and request medical or emergency assistance for others.

However, cellular communication networks are generally designed based on the presumption that only a small subset of mobile device users will attempt to access the network at any given time. In emergency situations, there is often a sudden spike in the number of cell phone calls as anxious people try to reach their families or call for help (e.g., police, 911). If the electrical power grid is affected, the cellular network may be forced to revert to battery-based or backup stations, reducing the number of resources available to subscribers affected by the emergency. In the event of natural disasters like earthquakes and hurricanes, a significant number of cell towers may be knocked out of commission for a period of time. These and other factors often combine to overload the cellular networks in emergency situations, causing service outages and/or long wait times before calls can get through.

When cellular networks are unable to support the call traffic in emergency situations, mobile device users will often make repeated unsuccessful attempts to access the network to place calls or send electronic messages (SMS or email). These repeated attempts may drain the mobile device's battery, cause collisions with other mobile devices, and/or further contribute to overloading the cellular network. The increased battery drain can become a problem in situations where the power remains out for an extended period of time or the individual is trapped in a location where recharging the battery is impossible. This can lead to mobile devices running out of battery power, leaving their users without communication capabilities when the cellular networks recover.

Existing solutions to various communication problems that can arise in emergency situation attempt to prioritize cell phone access to cellular networks through predetermined priorities, by implementing special cellular network features (e.g., originating radio channel priority or terminating radio channel priority), or by using "high probability of completion" formulations in which a network gives priority to calls or connection requests that have the highest probability of completion (i.e., those with the strongest signal can communicate). However, these solutions require either that priorities be pre-assigned to the mobile device, or that the network makes the priority determinations in real time based on an arbitrary standard (e.g., high probability of completion) that may block calls from the very people who most need to communicate during an emergency (e.g., injured wireless subscribers, etc.).

Pre-assigning call priorities is problematic because, aside from first responders, it is difficult to identify in advance those mobile devices that should be given priority in some future event. Allowing the network to make such determinations is also problematic, because the network may be required to transmit and receive a significant amount of information before such priority decisions can be made, which may further slow/overload the network and be impossible if network capacity is severely constrained.

The various embodiments overcome these and other limitations of existing solutions by enabling the mobile devices themselves to make intelligent call priority and battery usage decisions based on situational information collected by the mobile devices at the time of the emergency or other events that cause cellular service to be limited, congested, or otherwise overwhelmed with traffic (herein collectively "emergency situation"). Embodiments also enable mobile devices to collaborate to recognize an emergency situation and establish communications, such as via establishing device-to-device networks.

Various embodiments include device-centric and system-centric solutions for prioritizing and metering access to a telecommunication network based on situational information collected by mobile devices. A mobile device may be configured to recognize (e.g., from monitoring network traffic or connectivity) when an emergency situation exists and automatically launch an "emergency mode" application pre-installed on the mobile device. The emergency mode application may enable each mobile device to self-allocate, self-administer, and/or self-enforce network access priorities (e.g., dialing access priority, etc.) to reduce or throttle congestion on the network without directions from the network. Such device-centric operations may reduce network traffic by reducing the number of mobile devices attempting to connect the network at the same time, with the enforcement of network access priorities being enforced by the devices themselves without requiring network communications that could further contribute to network congestion.

In another embodiment, a network server may be configured to send out special notification (e.g., a signal, bit, command, SMS, etc.) to all the mobile devices serviced by the network that are within the area impacted by the emergency as soon the telecommunications network is informed of the occurrence of the emergency. This signal may help mobile devices to recognize an emergency situation so that they all launch their emergency mode applications. In yet another embodiment, the mobile device may be informed of an emergency situation by other mobile devices via short-range radio networks (e.g., Bluetooth®, WiFi, Zigbee®, etc.) or peer-to-peer connections, which may be established automatically based on one or more of the mobile devices determining that there is a relatively high probability that an emergency situation exists.

In various embodiments, a mobile device may be configured to initiate or launch an "emergency mode" application in response to detecting the existence of an emergency situation. The "emergency mode" application may collect various different types of information from the mobile device, and use the collected information to determine a priority for accessing the telecommunication network. Each mobile device may compute its own priority based on the collected information and/or may be assigned a priority by a network server. These priorities may indicate time windows and limited durations during which the mobile device is allowed to access the network. Users determined to be most likely in need of help (e.g., immobile based on accelerometer/gyroscope data gathered by the mobile device) or immediate access (e.g., experiencing a low battery) may be allocated higher priority, or longer or more frequent call windows. In an embodiment, the call/time windows may be staggered to reduce collisions and meter the network traffic.

In an embodiment, the mobile device may be configured to compute the priorities based on one or more priority determination rules. In an embodiment, the priority determination rules may be sent or pushed to the mobile device from a network server. The network server may push/send the priority determination rules to the mobile device periodically or as part of an irregular update during times of normal service in which there is no network congestion or emergency detected. The network server may modify the priority determination rules (or parameters of the priority determination rules) during times in which there is no congestion/emergency detected, in preparation of an emergency situation.

In an embodiment, the mobile device users may be organized into groups based on the information collected from the mobile device. In an embodiment, the system may be configured to determine the priorities and/or access rights of the mobile device based on the groups to which the mobile device user belongs.

In an embodiment, the mobile device may be configured to automatically establish peer-to-peer connections with other mobile devices in response to detecting an emergency situation or determining that there is a high probability that an emergency situation exits. The mobile device may be configured to use the peer-to-peer connections to communicate with other mobile devices (e.g., to confirm the likelihood of the existence of an emergency, send SMS messages, etc.). Alternatively or in addition the mobile device may be configured to use the peer-to-peer connections to use the network connectivity of the other mobile devices to send and receive messages to and from the telecommunications network.

In an embodiment, in response to detecting an emergency situation or as part of an emergency mode functionality the mobile device may be configured to disable non-essential applications (e.g., Netflix®, Hulu Plus™, YouTube®, etc.) and polling operations, halt background processes, dim the screen, and/or perform other similar power saving operations. In this manner the mobile device may conserve battery power for when needed to send messages or place calls during allotted time slots or upon restoration of normal network operation.

The various embodiments may be implemented within a variety of communication systems, such as the example communication system 100 illustrated in FIG. 1. A typical cell telephone network 11 includes a plurality of cell base stations 12 coupled to a network operations center 14, which operates to connect voice calls and data between mobile devices 10 (e.g., cell phones) and other network destinations, such as via telephone land lines (e.g., a POTS network, not shown) and the Internet 7. Communications between the mobile devices 10 and the telephone network 11 may be accomplished via two-way wireless communication links 13, such as 4G, 3G, CDMA, TDMA, LTE and/or other cell telephone communication technologies. The telephone network 11 may also include one or more servers 16 coupled to or within the network operations center 14 that provide a connection to the Internet 7.

The communication system 100 may further include network servers 18 connected to the telephone network 11 and to the Internet 7. The connection between the network server 18 and the telephone network 11 may be through the Internet 7 or through a private network (as illustrated by the dashed arrows). The network server 18 may also be implemented as a server within the network infrastructure of the telephone network 11.

Communication between the network server 18 and the mobile devices 10 may be achieved through the telephone network 11. The network server 18 may send application and control information (e.g., application software, metering information, special notifications, etc.) to the mobile devices 10 to update, create and/or maintain emergency settings and software for enabling, disabling, restricting and/or otherwise controlling the mobile device 10 features. Likewise, the mobile device 10 may collect mobile device-specific information (e.g., emergency contacts, location information, battery information, etc.) and send the collected information to the network server 18 (e.g., via the telephone network 11) for information and analysis. For example, the network server 18 may use mobile device-specific information received from multiple mobile devices to determine the existence of an emergency situation, and send out an alert or emergency notification to all the mobile devices serviced by the network that are within the area impacted by the emergency or communication network problem.

As mentioned above, communication networks are generally designed based on the presumption that only a small subset of mobile device users will attempt to access the cellular communication network at any given time. As such, most commercial communication networks are highly susceptible to overloading, especially in unusual events and emergency situations affecting a large number of people (e.g., earthquakes, terrorist attacks, black-outs, etc.) during which there may a sudden spike in the number of cell phone calls and message transmissions as users attempt to reach emergency personnel, family or friends. Natural disasters and terrorist attacks may damage a significant number of cell towers, further reducing the network's capacity and causing service outages and/or long wait times. Users that are denied access to the services may make repeated attempts to connect to the network, which may drain their mobile device battery, cause collisions with other mobile devices, and further contribute to overloading the network.

Figure 2:
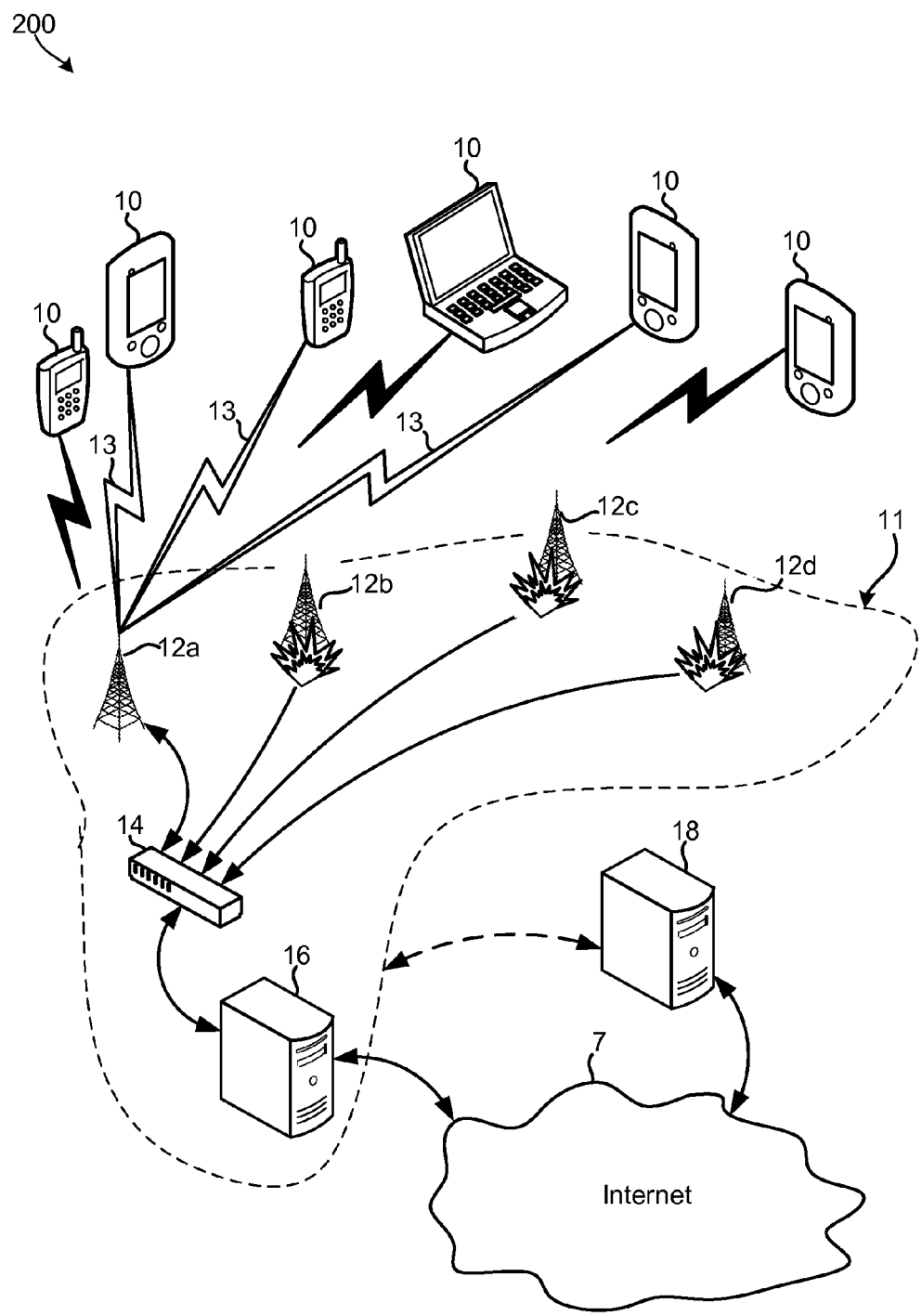
FIG. 2 is a communication system block diagram illustrating network components of an example telecommunication system experiencing an emergency situation detectable by various embodiments.

FIG. 2 illustrates an example communication system 200 in which network resources are damaged as a result of an emergency situation. In the example illustrated in FIG. 2, cell base stations 12b, 12c, 12d are damaged and/or inoperable. As a result all two-way wireless communication links 13 between the mobile devices 10 and the telephone network 11 are attempted via the remaining cell base station 12a. However, each cell base station 12a may only support a finite number of simultaneous communication links 13, so a large number of mobile device 10 users may be denied access to the telecommunications network 11. In the various embodiments a mobile device 10 configured with an embodiment emergency mode or application may detect the existence of the emergency situation (either locally or via information received from other mobile devices or from a network server) and perform operations on the mobile device to prioritize and meter access to the telecommunication network. Mobile devices may be configured to make intelligent priority, connection, and battery usage decisions based on situational information collected by the mobile device at the time of the emergency, without requiring excessive or cumbersome communications that could further contribute to network congestion. If most or all mobile devices are equipped with an embodiment mode or application, the overall effect will be reduced network traffic flowing through the remaining cell base station 12a. As a result each mobile device will be able to communicate via the network during self-allocated time slots, enabling all device users to have at least some communication capabilities during the emergency situation.

Figure 3:
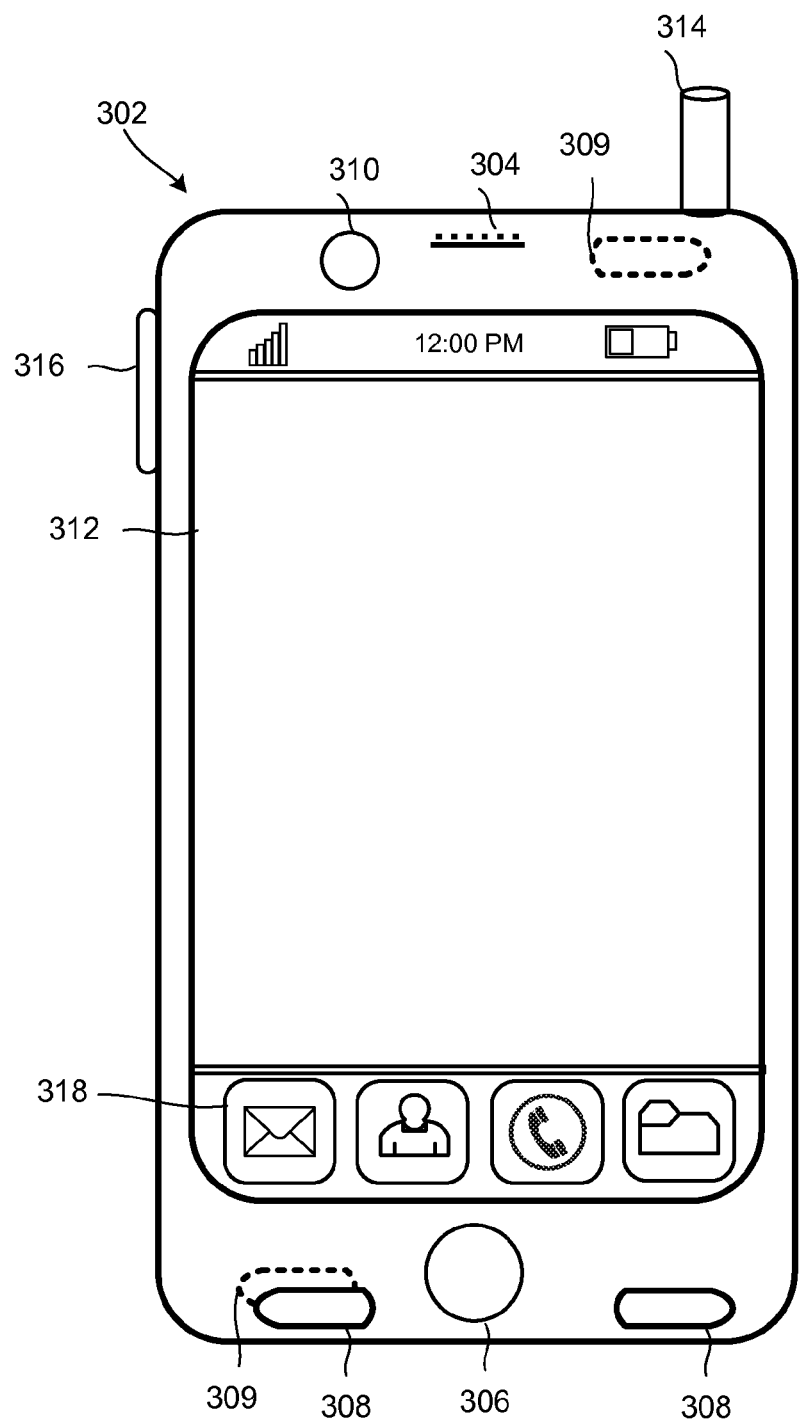
FIG. 3 is an illustration of an example mobile device suitable for detecting the existence of an emergency and making intelligent priority, connection, and/or battery usage decisions in accordance with the various embodiments.

FIG. 3 illustrates sample components of a mobile device 302 that may be configured to detect the existence of an emergency situation and make intelligent priority, connection, and/or battery usage decisions in accordance with various embodiments. The mobile device 302 may include a speaker 304, user interface elements 306, 316, 318 for receiving user inputs, one or more microphones and/or microphone arrays 308 for capturing sounds, an antenna 314 for sending and receiving electromagnetic radiation, a camera 310 for capturing images, an electronic display 312, and other well known components (e.g., accelerometer, gyroscope, etc.) of modern electronic devices (e.g., electronic personal trainers, smartphones, mobile gaming consoles, etc.). The user interface elements 306, 316, 318 (e.g., buttons, icons, etc.) may be implemented as hard key buttons, soft key buttons, as a touch keys, or any other way of receiving user input. The mobile device 302 may also include a processor and memory configured to receive and/or execute software applications from an application download server (e.g., an Apple® App Store server, etc.).

The mobile device 302 may include one or more geospatial positioning and navigation systems/components, such as a global positioning system (GPS) receiver configured to receive GPS signals from GPS satellites to determine the geographic position of the mobile device 302. The mobile device 302 may also include other systems/components for determining the geographic position of the device 302, such as resources for determining the radio signal delays (e.g., with respect to cell-phone towers and/or cell sites), performing trilateration and/or multilateration operations, identifying proximity to known networks (e.g., Bluetooth® networks, WLAN networks, WiFi, etc.), and/or for implementing other known geographic location technologies. The mobile device 302 may further include one or more sensors 309 for monitoring physical conditions (e.g., direction, motion/acceleration, orientation, pressure, etc.) on or around the mobile device 302.

Software installed on the mobile device 302 may communicate with a network server and/or other mobile devices via a direct communication link between the devices, through a central server, via short-range radio technologies (e.g., Bluetooth®, WiFi, etc.), via peer-to-peer connections, or via any other known mobile or wireless communication technologies.

In an embodiment, the mobile device 302 may be configured to receive special notifications (e.g., an emergency alert, signal, command, SMS, etc.) from the network server, and launch an "emergency mode" application in response to receiving the special notification. In this embodiment, a network server may be configured to send out the special notification to all the mobile devices serviced by the network that are within the area impacted by the emergency or reduction in network communication bandwidth as soon the telecommunications network detects (or is informed of) the occurrence of the event.

In an embodiment, the emergency mode may be user-launchable, and/or the mobile device 302 may be configured to present users with an option to manually launch the emergency mode application at anytime, such as by pressing or actuating a user interface element 306, 316, 318 on the mobile device 302.

In various embodiments, the mobile device 302 may be configured to recognize when an emergency or network problem exists so that it can automatically activate the emergency mode. It may be difficult for a single communication device to recognize when a large network outage or emergency situation exists based on the information it can gather alone. Therefore, in an embodiment the mobile device processor may calculate a probability that an emergency exists based upon the information available to it, adjust the probability with each new sensor or data input, and launch the emergency mode (or prompt the user to launch the emergency mode) when the calculated emergency probability value exceeds a threshold probability value. The threshold probability may be user-selectable, set by a network operator (statically or dynamically), or set by an organization for mobile devices used by its employees. The mobile device 302 may be configured to display a prompt requesting user input regarding launching the emergency mode application if the computed emergency probability is greater than a first threshold value (e.g., is greater than 25%, 50%, 75%) and automatically launch the emergency mode when the computed emergency probability is greater than a second higher threshold value (e.g., is greater than 80%, 90%, 95%, etc.). Also, the mobile device 302 may be configured to automatically launch the emergency mode application in response to not receiving any user input after displaying a user input screen, pop-up window, and/or prompt informing the user of the possibility of the existence of an emergency situation and/or requesting user input to launch the emergency mode application.

In an embodiment, the mobile device 302 may be configured to receive information identifying the existence of an emergency situation from other mobile devices over a peer-to-peer and/or short-range wireless connection (e.g., Bluetooth®, WiFi, Zigbee®, Peanut®, etc.). Such connections may be established automatically in response to the mobile device 302 determining that it cannot establish a connection to the telecommunications network, in response to receiving a receive special notification or a broadcast message, in response to the computed emergency probability exceeding a third threshold value (e.g., a threshold value below the first threshold value), or in response to receiving a connection request from another mobile device. For example, if the mobile device detects some conditions that might indicate an emergency situation exists, but its computed emergency probability is relatively low, it may activate a short-range wireless connection and attempt to establish a short-range communication link with other mobile devices, such as by broadcasting a discovery signal from a Bluetooth® transceiver. If other mobile devices have also detected an emergency condition they may also activate their corresponding short-range wireless transceivers, enabling mobile devices to establish an ad hoc wireless network. Through such an ad hoc wireless network the mobile devices may exchange information regarding their own computed emergency probabilities and/or sensed conditions to enable a group decision to be made regarding whether an emergency condition exists. Also or alternatively, the mobile devices may exchange messages indicating whether they have entered the emergency mode, thereby enabling one mobile device that has confirmed that the emergency mode is appropriate (e.g., by receiving a user input or a network special announcement message) to inform other mobile devices of the situation.

Figure 4:
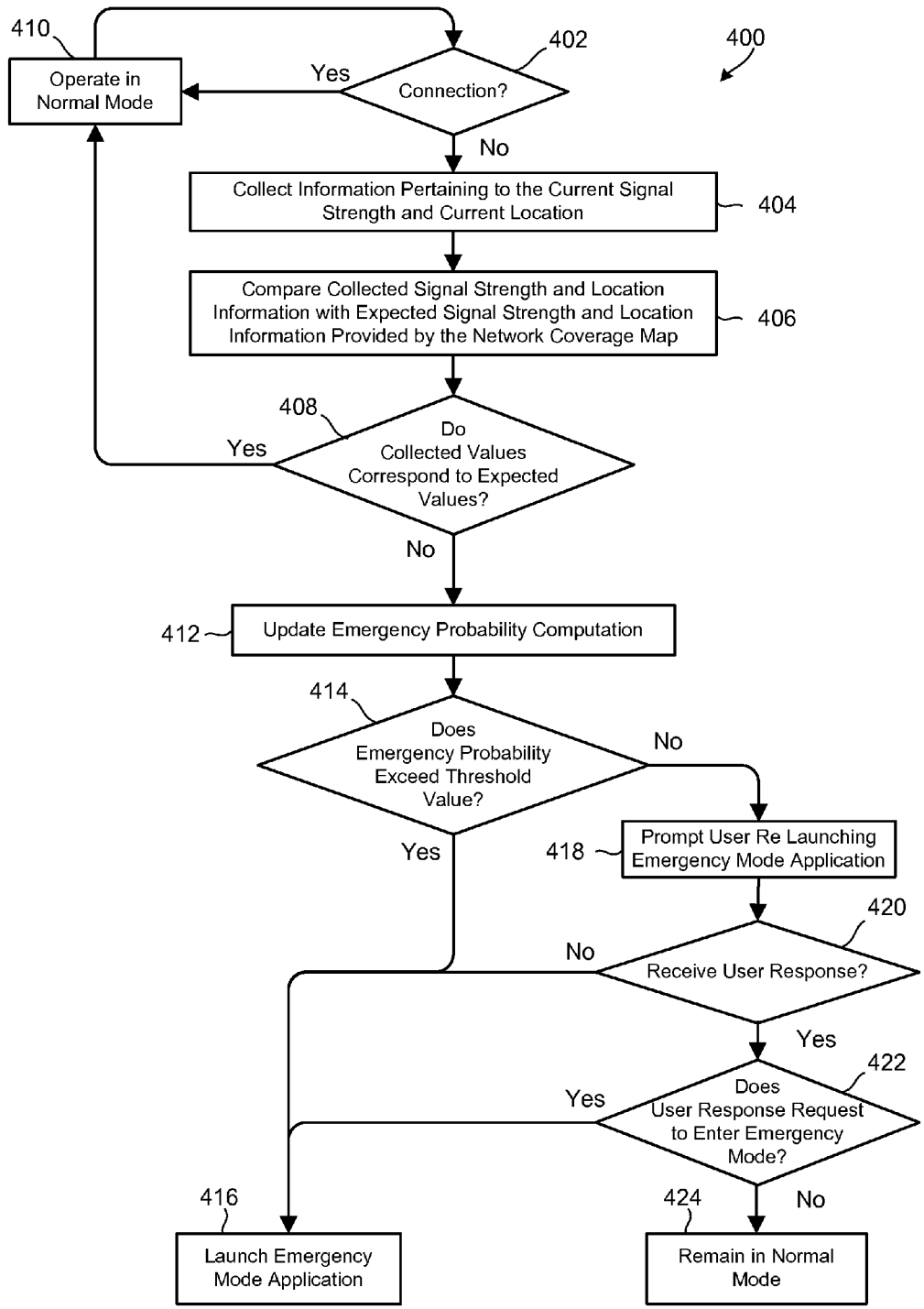
FIG. 4 is a process flow diagram illustrating an embodiment mobile device method for detecting the existence of an emergency situation based on signal strength and location information collected on the mobile device.

FIG. 4 illustrates an embodiment mobile device method 400 by which a mobile device may detect the existence of an emergency situation based on signal strength and location information collected on the mobile device. The operations of method 400 may be performed by a processor of a mobile device, such as a central processor unit (CPU), a wireless modem processor, or both. In determination block 402, the processor may attempt to establish a connection to a telecommunications network and/or determine whether a connection can be established with the telecommunications network. Such an attempt may be made in the event that a current connection is lost or upon power-on of the mobile device. If the processor determines that a wireless network connection can be established (i.e., determination block 402="Yes"), the mobile device processor may return to or continue operating in a normal network communication mode in block 410. While in normal mode, if a communication connection is lost the processor may again attempt to establish connections to the network and determine whether a connection can be established in determination block 402.

If the processor determines that a connection cannot be readily established (i.e., determination block 402="No"), the mobile device processor may begin collecting information pertaining to the current signal strength and a current geographical location of the mobile device in block 404. In block 406, the processor may access a stored network coverage map that includes information for identifying signal strengths available at various geographical locations, and compare the collected signal strength value with signal strength values provided by the network coverage map for the current geographical location of the mobile device. In determination block 408, the processor may determine whether the current signal strength values are commensurate with (e.g., is approximately equal to, etc.) the expected signal strength values identified by the network coverage map for the current location.

If the processor determines that the collected signal strength values are commensurate with the expected signal strength values identified by the network coverage map for the current geographical location of the mobile device (i.e., determination block 408="Yes"), in block 410, the mobile device may continue operating in normal mode and repeat the operations in blocks 402-408 periodically, on demand, or as is required.

If the processor determines that the signal strength is not commensurate with the expected signal strength value for the current location (i.e., determination block 408="No"), in block 412, the processor may use the signal strength comparison to calculate and/or update an emergency probability value related to the likelihood that an emergency situation exists. In determination block 414, the processor may determine whether the computed emergency probability value equals or exceeds a threshold value (e.g., is greater than 25%, 50%, 75%, 90%, 99%, etc.). If the processor determines that the computed emergency probability value is greater than the threshold value (i.e., determination block 414="Yes"), in block 416, the processor may launch the emergency mode application, or display an input screen requesting user input for launching the emergency mode application.

If the processor determines that the computed emergency probability value is not greater than the threshold value (i.e., determination block 414="No"), in block 418, the processor may present a prompt on the device's display informing the user that an emergency situation may exist and/or requesting user input for selecting an operating mode (e.g., to launch "emergency mode" application or to continue operating in normal mode). In determination block 420, the processor may wait a predetermined amount of time, and determine whether a user input has been received in response to the prompt. If the processor determines that a user input has not been received after the predetermined amount of time (i.e., determination block 420="No"), in block 416, the processor may automatically launch the emergency mode application. If the processor determines that a user input has been received in response to the prompt (i.e., determination block 420="Yes"), in determination block 422, the processor may determine if the user's response/input requests that the mobile device be placed in the emergency mode.

If the processor determines that user's response/input requests that the mobile device be placed in the emergency mode (i.e., determination block 422="Yes"), in block 416, the processor may launch the emergency mode application. If the processor determines that user's response/input does not request that the processor enter the emergency mode (i.e., determination block 422="No"), in block 424, the processor may continue operating in normal mode.

In an embodiment, the mobile device may be configured to update the stored coverage map with location and signal strength information collected by the mobile device during normal times (i.e. when there is no emergency). In an embodiment, the updates to the coverage map may be communicated to a network server when bandwidth is available and/or during times in which there is no emergency. The network server may aggregate and/or "crowd source" the information received from multiple mobile devices, and push updated network coverage map information to one or more mobile devices via over-the-air updates.

In an embodiment, the mobile device may be configured to collect and store location and signal strength information on the mobile device each time the mobile device loses coverage. In an embodiment, the mobile device processor may compare information regarding its current location and the signal strength of signals received from network base stations with the stored location and signal strength information to determine whether the mobile device is in area that has historically experienced poor network coverage. If the processor determines that the mobile device is in area that has historically experienced poor network coverage, the processor may display a prompt informing the user that the device is not likely experiencing an emergency (e.g., via a probability value, etc.), but may continue to enter the emergency mode and/or launch the "emergency mode" application if the user desires. In an embodiment, the stored historical network coverage information and/or results of the comparisons may be used as part of the emergency probability computation.

Figure 5:
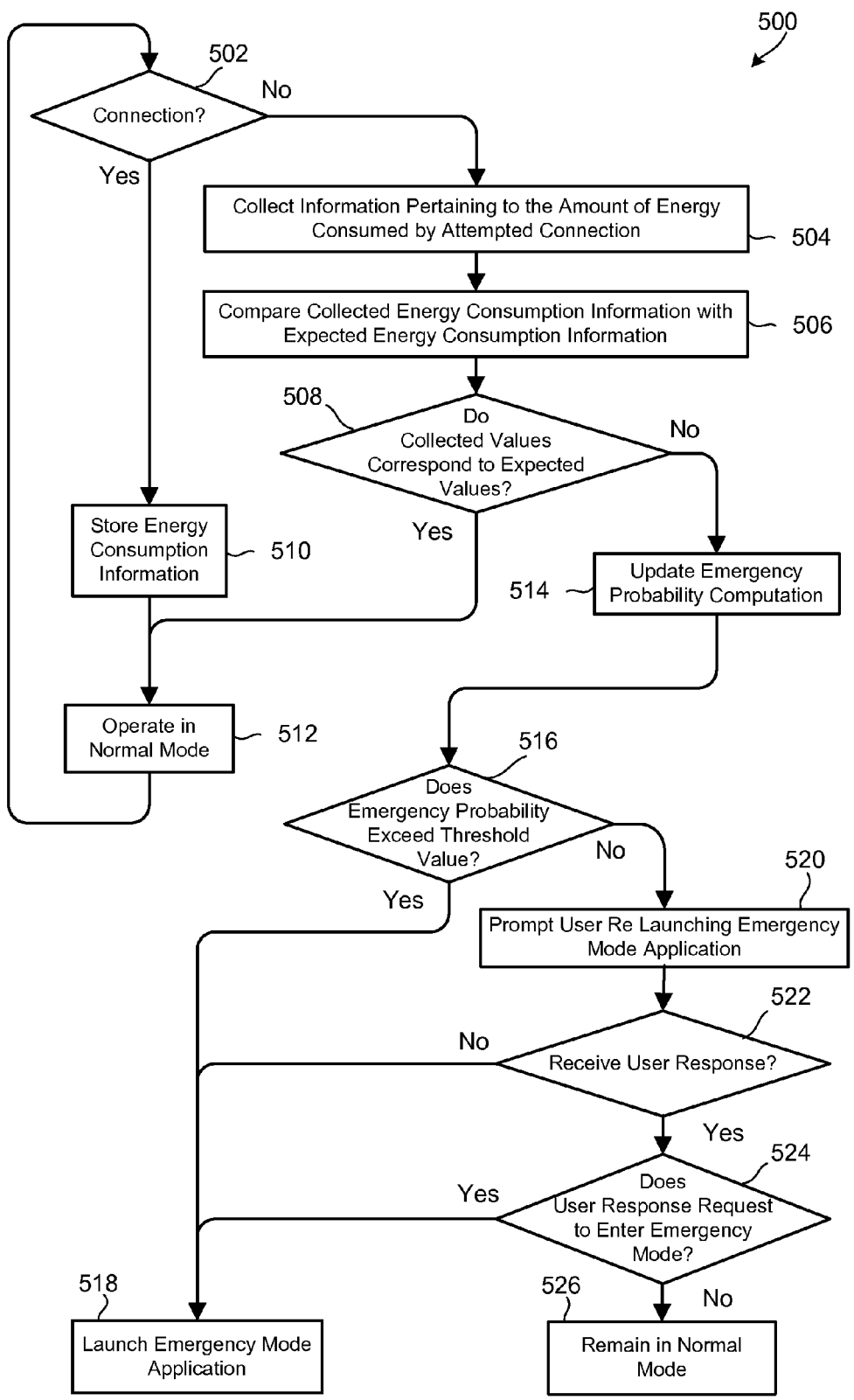
FIG. 5 is a process flow diagram illustrating an embodiment mobile device method for detecting the existence of an emergency situation based on battery consumption information collected on the mobile device.

FIG. 5 illustrates an embodiment mobile device method 500 for detecting the existence of an emergency situation based on battery consumption information collected on the mobile device. The operations of method 500 may be performed by a processor of a mobile device, such as a CPU, a wireless modem processor, or both. Since mobile device will boost the power of radio signals transmitted when a wireless communication link is weak or noisy, wireless connections established by the mobile device during situations where there are fewer, more distant operational base stations, or when rubble or heavy rains attenuate the wireless signals may require significantly more power than during normal times. Thus, the power consumption of a wireless connection may serve as a measure of the degree of communication loss that has occurred. Also, during an emergency condition exists, monitoring and conserving battery power reserves may be an important functionality of an emergency mode.

In method 500 in determination block 502, the mobile device processor may determine whether a connection can be established with the telecommunications network. If the processor determines that a connection can be established (i.e., determination block 502="Yes"), in block 510, the processor may store information pertaining to how much electrical power was required to establish and maintain the connection in the current geographical location. In block 512, the mobile device may continue operating in normal mode and periodically attempt to establish another connection in block 502.

If the processor determines that a wireless connection cannot be not be established (i.e., determination block 502="No"), in block 504, the processor may collect information pertaining to the amount of electrical power (e.g., battery drain) consumed in attempting to establish a connection and information pertaining to the current location of the mobile device. In block 506, the processor may compare the collected power consumption information with previously stored power consumption information for the current geographical location of the mobile device. In determination block 508, the processor may determine whether there is a significant difference between the collected power consumption information and amount of energy previously required to establish similar connections at or near the current geographical location (e.g., within 100 meter radius, 500 meter radius, 1 mile radius, 5 mile radius, etc.). If the processor determines that the collected power consumption information is approximately equal to the previously stored power consumption information for the current location (i.e., determination block 508="Yes"), in block 512, the mobile device may continue operating in normal mode, attempting to reestablish a wireless connection any time the communication link is lost.

If the processor determines that the power consumed while attempting to establish a current connection is significantly greater than previously required at the location (i.e., determination block 508="No"), in block 514, the processor may calculate and/or update an emergency probability value of the likelihood that an emergency situation exists.

In determination block 516, the processor may determine whether the computed emergency probability value is greater than a threshold value. If the processor determines that the computed emergency probability value is greater than the threshold value (i.e., determination block 516="Yes"), in block 518, the processor may launch the emergency mode application. If the processor determines that the computed emergency probability value is not greater than the threshold value (i.e., determination block 516="No"), in block 520, the processor may display a prompt informing the user that an emergency situation may exist and/or requesting user input regarding whether the processor should launch the "emergency mode" application or continue operating in normal mode. This prompt may also inform the user of the current power consumption of the mobile device and/or an estimate of the remaining operating time based on the current power consumption and battery energy storage level. This information may enable the user to determine whether the emergency mode should be launched to conserve battery life even if it is unclear whether an emergency condition exists.

In determination block 522, the processor may wait a predetermined amount of time and determine whether user input has been received in response to displaying the prompt. If the processor determines that user input has not been received after the predetermined amount of time (i.e., determination block 525="No"), in block 518, the processor may launch the emergency mode application. If the processor determines that user input has been received in response to displaying the prompt (i.e., determination block 522="Yes"), in determination block 524, the processor may determine if the user's response/input requests that the mobile device be placed in the emergency mode.

If the processor determines that user's response/input requests that the mobile device be placed in the emergency mode (i.e., determination block 524="Yes"), in block 518, the processor may launch the emergency mode application. If the processor determines that user's response/input does not request that the processor enter the emergency mode (i.e., determination block 524="No"), in block 526, the processor may continue operating in normal mode.

Figure 6:
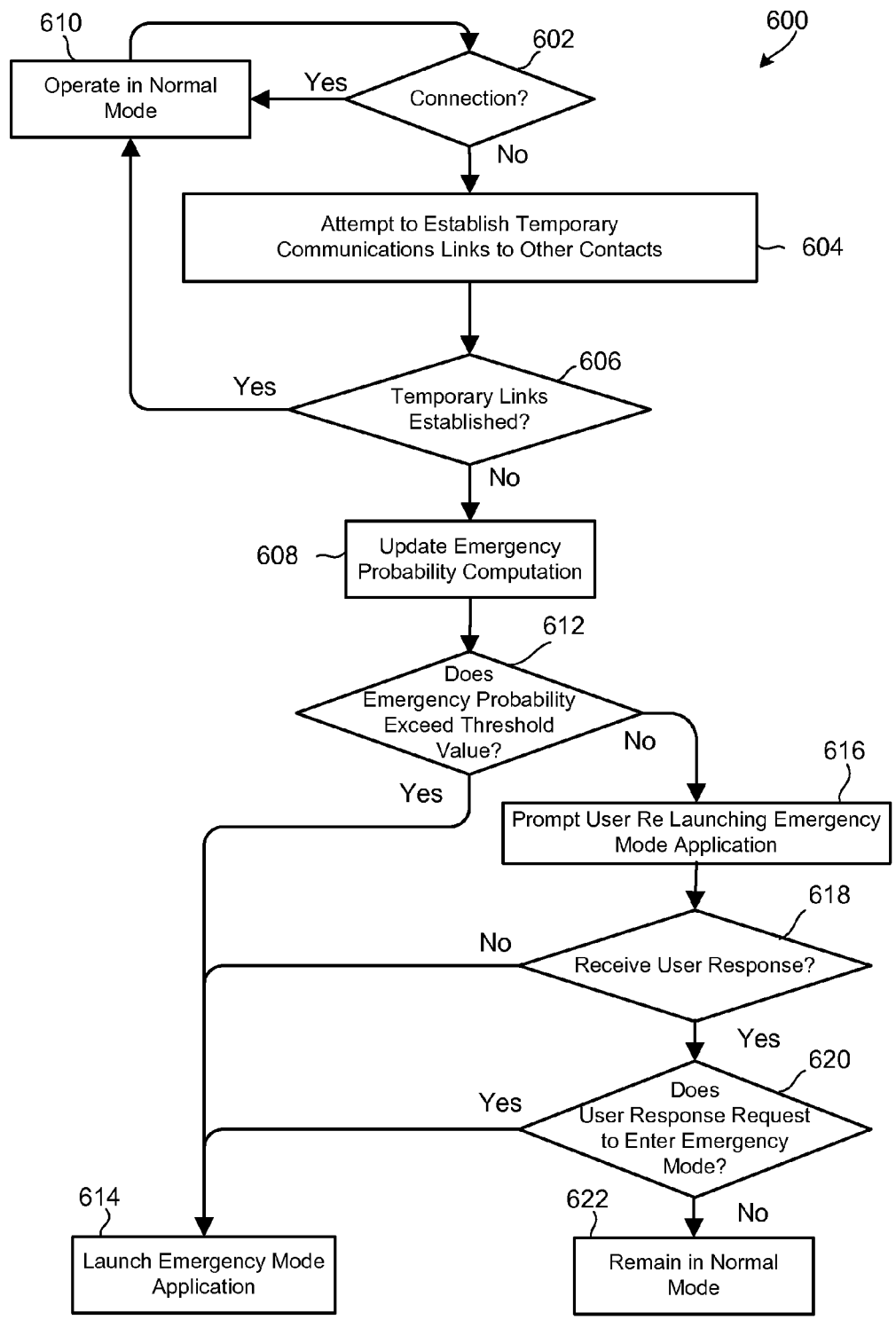
FIG. 6 is a process flow diagram illustrating an embodiment mobile device method for detecting the existence of an emergency situation based on repeated failed attempts to establish a connection to a telecommunication network from the mobile device.

In situations where the user of a mobile device happens to be positioned close to a wireless base station, the wireless communication link to the telecommunications network may be strong even though communications through the network are severely impaired. In such conditions the mobile device may be unable to detect the emergency condition based on signal strength or power consumption. Thus, the strong signal (and thus low power consumption) required to establish and maintain a connection with a cellular base station may mask the fact that the network is congested or overwhelmed and communications with others is greatly restricted. Also, if the mobile device is maintaining a communication link to the base station but the user has no urgent need to communicated (e.g., the user is not injured or worried about others), maintaining that connection may prevent others with an urgent need from obtaining a connection to the base station. To account for this possibility, FIG. 6 illustrates an embodiment mobile device method 600 for detecting the existence of an emergency situation based on repeated failed attempts by the mobile device to place a call or establish a communication link to another telephone number or computing device via a telecommunication network. The operations of method 600 may be performed by a processor of a mobile device, such as a CPU, a wireless modem processor, or both.

In method 600 in determination block 602, the processor may attempt a call or communication and determine whether a connection can be established over a particular channel or to a specific phone number. This operation may be periodically performed as a test of the network conditions, such as a data call to a particular URL or a telephone call to a computing device configured to answer the call but quickly hang up. This operation may be performed a predetermined number of times if a first attempt is not successful to minimize the chances of a false alarm. If the processor determines that a connection can be established over the particular channel or to the particular number (i.e., determination block 602="Yes"), in block 610, the mobile device may continue operating in the normal mode, and periodically reattempt connections to the specific number to test the network in block 602.

If, after repeated failed attempts to establish a connection to a particular channel or a specific phone number, the processor determines that a connection may be not be readily established (i.e., determination block 602="No"), the processor may automatically attempt to place a call to other phone numbers or establish temporary communication links with other channels in block 604 (e.g., in order to determine whether the entire network is congested). In an embodiment, the automatic attempts to establish temporary communication links may be performed in the background and/or without any user interaction.

In determination block 606, the processor may determine whether any temporary communication links can be established over the other available channels or numbers. If the processor determines that other phone numbers can be called and/or temporary communication links can be established (i.e., determination block 606="Yes"), in block 610, the mobile device may continue operating in normal mode, and return to periodically testing the network availability in block 602. If the processor determines that other numbers cannot be called and/or temporary communication links cannot be established (i.e., determination block 606="No"), in block 608, the processor may calculate and/or update an emergency probability value reflecting a likelihood that an emergency situation exists. In an embodiment, information pertaining to the establishment of temporary communication links and number of attempted and/or failed calls may be used as part of the emergency probability computation. For example, with each failed connection attempt the emergency probability value may be increased (and evaluated in determination block 612), and with each successful connection attempt the emergency probability value may be decreased.

In determination block 612, the processor may determine whether the computed emergency probability value is greater than a threshold value. If the processor determines that the computed emergency probability value is greater than the threshold value (i.e., determination block 612="Yes"), in block 614, the processor may launch the emergency mode application. If the processor determines that the computed emergency probability value is not greater than the threshold value (i.e., determination block 612="No"), in block 616, the processor may display a prompt informing the user that an emergency situation may exist and/or requesting user input regarding whether the processor should launch the "emergency mode" application or continue operating in a normal mode.

In determination block 618, the processor may wait for a predetermined amount of time, and determine whether user input has been received in response to displaying the prompt/input screen. If the processor determines that user input has not been received after the predetermined amount of time (i.e., determination block 618="No"), the processor may launch the emergency mode application in block 614. If the processor determines that user input has been received in response to the prompt (i.e., determination block 618="Yes"), in determination block 620, the processor may determine if the user's response/input requests that the mobile device be placed in the emergency mode.

If the processor determines that user's response/input requests that the mobile device be placed in the emergency mode (i.e., determination block 620="Yes"), in block 614, the processor may launch the emergency mode application. If the processor determines that user's response/input does not request that the processor enter the emergency mode (i.e., determination block 620="No"), in block 622, the processor may continue operating in normal mode.

While not included in FIGS. 4-6, the mobile device processor may also be configured to exit the emergency mode or emergency mode application in response to a user input (e.g., entered in response to an application menu), upon receive a signal from a telecommunications network (e.g., an "all clear" message), or upon detecting a return to normal cellular network characteristics. For example, the mobile device processor may be configured to periodically display a prompt on the device's display asking the user whether emergency mode operations should be continued or terminated. As another example, the mobile device processor may be configured to monitor the signal strength of cellular base station signals, and exit the emergency mode or emergency mode application when signal strengths return to normal. Upon exiting the emergency mode or emergency mode application the processor may promptly return to one or more of determination blocks 402, 502 or 602 to verify that the emergency conditions have ceased to exist.

Figure 7:
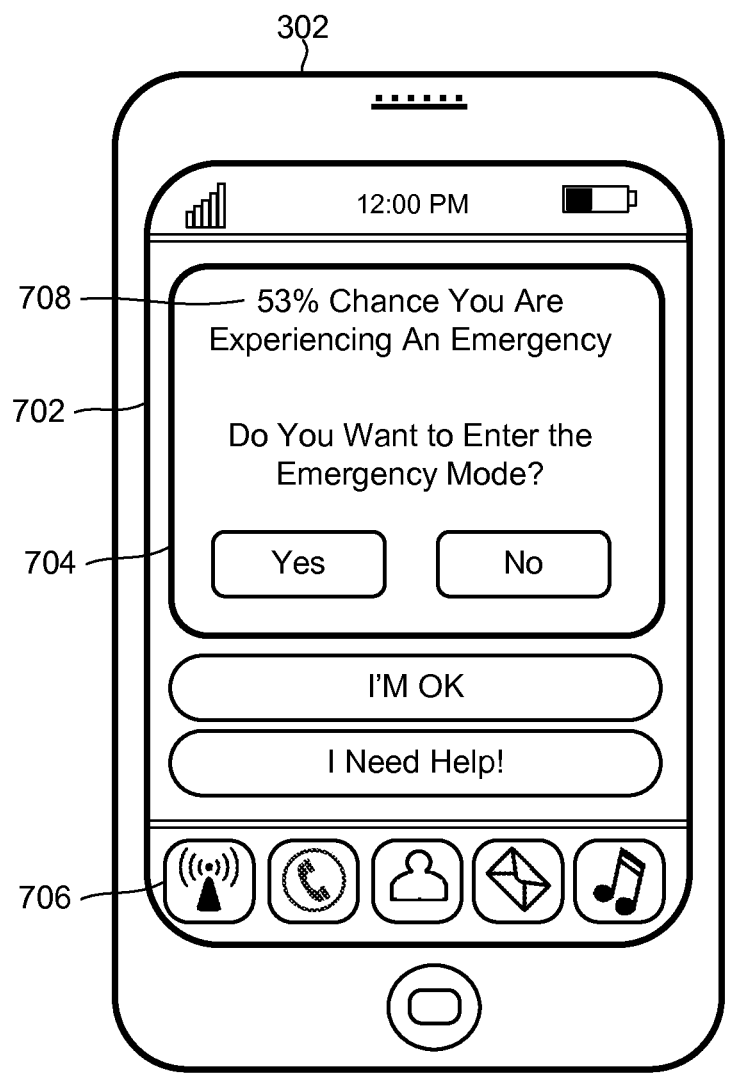
FIG. 7 is an illustration of an embodiment mobile device having a user interaction system configured to display information for informing users of the existence of an emergency situation.

FIG. 7 illustrates an example user interface display 702 of a mobile device 302 configured in accordance with the various embodiments. The user interface display 702 may include a user prompt, input screen or "pop-up" window 704 (collectively "prompt") that is presented to the users on an electronic display of the mobile device 302 based upon the mobile device 302 detecting the existence of an emergency situation (or a high probability that such an emergency exists). For example, the mobile device 302 may be configured to display the prompt 704 requesting user input for launching the emergency mode application when the computed emergency probability value is greater than a threshold value (e.g., is greater than 25%, 50%, 75%, etc.). The emergency probability value 708 may be displayed as part of the prompt 704, as may be other information that the processor has used in computing the emergency probability value (e.g., power consumption, number of failed attempts to make a call, etc.).

In an embodiment, the mobile device 302 may be configured to enable users to manually launch the emergency mode application at anytime such as by pressing or actuating user interface element 706 on the mobile device 302.

As discussed above, the mobile device 302 may be configured to launch the emergency mode application in response to detecting various conditions. The emergency mode application may collect various different types of information from the mobile device 302, including emergency contacts, the amount of energy remaining in the battery, the received network signal strength, global positioning system (GPS) coordinates, accelerometer information (e.g., how much the cell mobile device 302 user has moved since the emergency started), information from other sensors (e.g., gyroscope, etc.), call history information (e.g., whether the user called a doctor or hospital or 911 earlier in the day before emergency), user pay-to-play selections (e.g., if the user is willing to pay extra to connect the call), and other information. In various embodiments, this collected information may be used by the mobile device processor to compute a probability that an emergency situation exists, for identifying a calling or network access priority for the mobile device, and/or for identifying mobile device features/operations that should be enabled or disabled.

Figure 8:
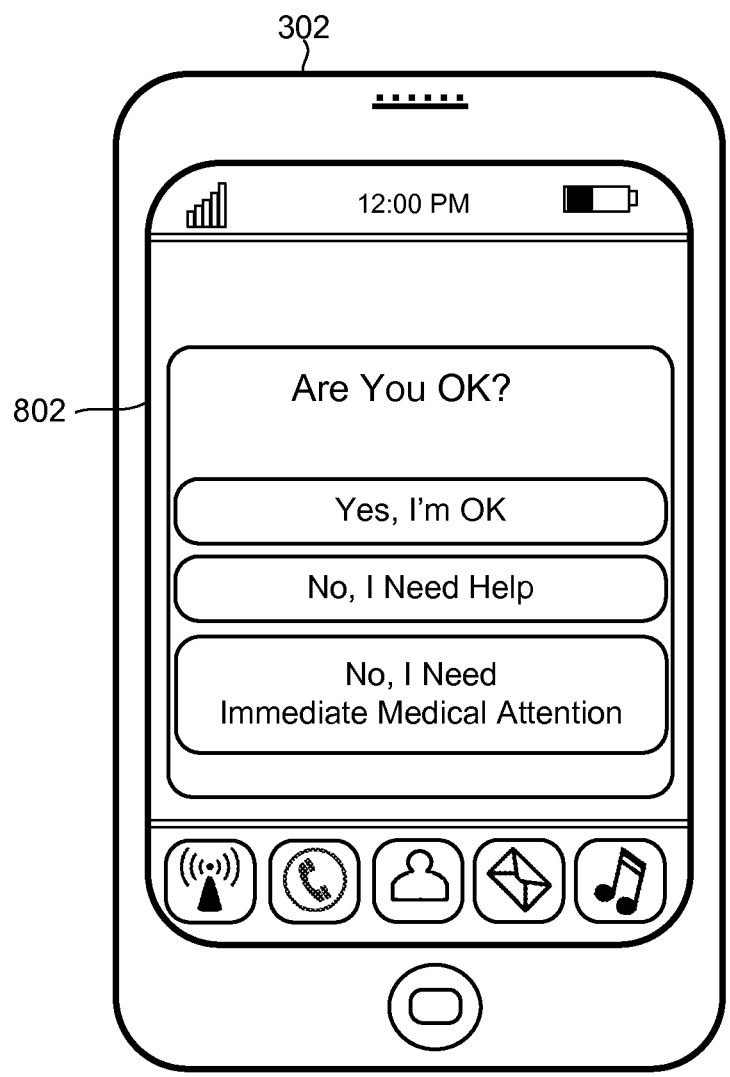
FIG. 8 is an illustration of an embodiment mobile device on which an emergency mode application has been launched.

FIG. 8 illustrates an example user interface display 802 of a mobile device 302 on which an emergency mode application has been launched. The user interface display 802 may request input from the user, such as by asking whether the user is OK or whether the user needs immediate help. The user's response may be collected and sent to the server and/or may be used locally by the mobile device 302 to identify the mobile device features/operations that should be enabled or disabled. For example, if the user indicates that he/she is "OK," the mobile device may automatically send a notification to all the contacts stored in an emergency contact list on the mobile device informing them that the user is safe. On the other hand, if the user indicates that he/she needs immediate help and/or if the processor determines that the mobile device 302 has been still (e.g., indicated by accelerometer and/or gyroscope data collected on the mobile device) for a duration exceeding a predetermined threshold value, the mobile device 302 may enter an "Emergency Beacon" mode in which the mobile device 302 may periodically take a photograph and/or record a snippet of surrounding sound, and send that information along with location information (e.g., GPS coordinates) to a predetermined list of contacts or recipients. For example, the mobile device may be configured to automatically contact emergency personnel (e.g., 911, police, etc.) and/or emergency contacts in response to detecting the existence of an emergency situation and determining that the device has not been moved for a predetermined amount of time. Such a message may inform fire/rescue personnel of the location in information regarding the condition of a potentially injured user even when the user is unable to make a call or send a message.

In an embodiment, the emergency mode application may display indications or information that may be useful in the particular emergency situation, such as how many calls a tower can support, how many calls are in progress, the mobile device's position in an access/call priority queue, extra information on the criteria used to place the user in the access/call priority queue, etc. Such information may be used to make informed decisions and/or take other actions to access the telecommunications network. For example, if in response to the mobile device displaying the user's position in a priority queue, the user feels that he/she is too low in the queue, he/she may enter an input indicating the user is injured and therefore in need of immediate assistance. As another example, the user may enter an input to invoke a pay-to-call feature that enables them to move up in the priority queue by paying an additional fee to the telecommunications network.

In an embodiment, the emergency mode application may automatically disable non-essential applications (e.g., Netflix®, YouTube®, etc.) and/or polling operations on the mobile device 302 to reduce network traffic and/or conserve the energy stored in the battery. In an embodiment, the emergency mode application may cause the mobile device processor to collect information pertaining to the battery's charge state (e.g., a measure of the amount of energy stored in the battery), and determine whether the battery's charge state is below a predetermined threshold. The emergency mode application may also cause the mobile device processor to halt background processes that consume power, turn off short-range wireless radios (e.g., Bluetooth®, WiFi, etc.), dim the screen, alter the user interface (e.g., remove background icons and pictures, lower the resolution, etc.), and/or perform other similar power saving operations. In an embodiment, the processor may display a prompt requesting the user to select operations that should be disabled and/or identify operations that should continue. This prompt may be in the form of a menu that leads the user through a series of selections for reducing power consumption by the device in order to extend the duration of use before the battery reserve is exhausted.

In an embodiment, the mobile device 302 may be configured to automatically send the collected user and device information to a network server, which may use the information received from all mobile devices to centrally determine caller priorities for each device. The network server may processes the information separately for each base station coverage area and allocate priorities to mobile devices based on each base station's availability or bandwidth. The network server may push the assigned calling priorities to the mobile devices for implementation. Users determined to be most likely in need of help (e.g., immobile based on accelerometer data gathered by the mobile device 302) or immediate access (e.g., experiencing a low battery) may be allocated higher priority than mobile devices without such conditions.

Mobile device priorities may also depend upon the available local communications bandwidth. For example, in a situation where the network is only partially overloaded, all mobile devices may be assigned a higher priority, enabling more frequent communications. However, in cells where a base station is experiencing heavy demand from many mobile devices, the priority assigned to the mobile devices within that cell may be reduced.

In an embodiment, the emergency mode application may cause the mobile device processor to use the collected information to determine for itself a priority for accessing the communication network. In the various embodiments, this access priority calculation may be configured so that when implemented on most if not all mobile devices, each mobile device is able to access an available network sufficient to report the user's location and condition consistent with the urgency of each user's condition. This may be achieved by each mobile device performing operations that are designed to automatically apportion cellular network usage so that all mobile devices receive some network access according to a set of predefined rules. Such predefined rules may be configured so that priority is apportioned to those users who may have a greater need to make calls, send messages, and/or otherwise access the telecommunication network. Similar to the network-determined priority embodiments, in the autonomous embodiments, the predetermined rules may be configured so that users determined by their mobile device to be most likely in need of help (e.g., immobile based on accelerometer data gathered by the mobile device) or immediate access (e.g., experiencing a low battery) may be allocated higher priority than mobile devices without such conditions.

In order to balance the load on a communication network, access priorities assigned by a network or autonomously generated pseudo-randomly by each mobile device according to predetermined rules may be used to determine time windows and limited durations during which each mobile device is allowed to access the network. In an embodiment, the assignment of call windows and/or metering of network traffic may be accomplished using a random number type algorithm that may be implemented autonomously on each mobile device. For example, the mobile device processor may be configured to compute a pseudorandom number in addition to the priority value. The processor may multiply the computed priority value by the pseudorandom number to compute an amount of time and/or a certain point in time in which the mobile device may access the network. In an embodiment, the computed call times and durations (together "call windows") may be displayed on the mobile device screen so that the user knows when the mobile device will be ready or able to access the network. This may include displaying a prompt when the user's call window begins and/or a countdown displaying the amount of time remaining until the call window ends. In an embodiment, user attempts to access the network outside of the user's call window may be stored in a network-task execution queue and automatically performed when user's call window begins.

By using a pseudorandom number generated by each mobile device, all mobile devices may autonomously determine access times during which they may access the network. As a result, network access attempts will be distributed randomly among a much large number of mobile devices than would be possible if all devices attempted to call/communicate whenever their users elected. Using a pseudorandom algorithm for accessing a network enables call windows to be staggered in order to reduce collisions and meter the traffic present on the network at any given time. Using a pseudorandom number generated by each mobile device enables call metering without the need for centralized control and management, which may not be available in an emergency situation (e.g., when a network server is put out of commission).

The mobile devices may also be configured to implement autonomous routines that enable the devices to self-group themselves and/or self-administer priorities for accessing the network. In an embodiment, the priorities and/or access rights may be determined by organizing the mobile device users into groups. When network services are available such group organizing may be accomplished by a network server, with group identifies and information pushed out to the mobile devices. In an embodiment, the mobile devices may be configured to generate the groups and administer the priorities locally, such as via ad hoc local wireless networks as described in more detail below.

Figure 9:
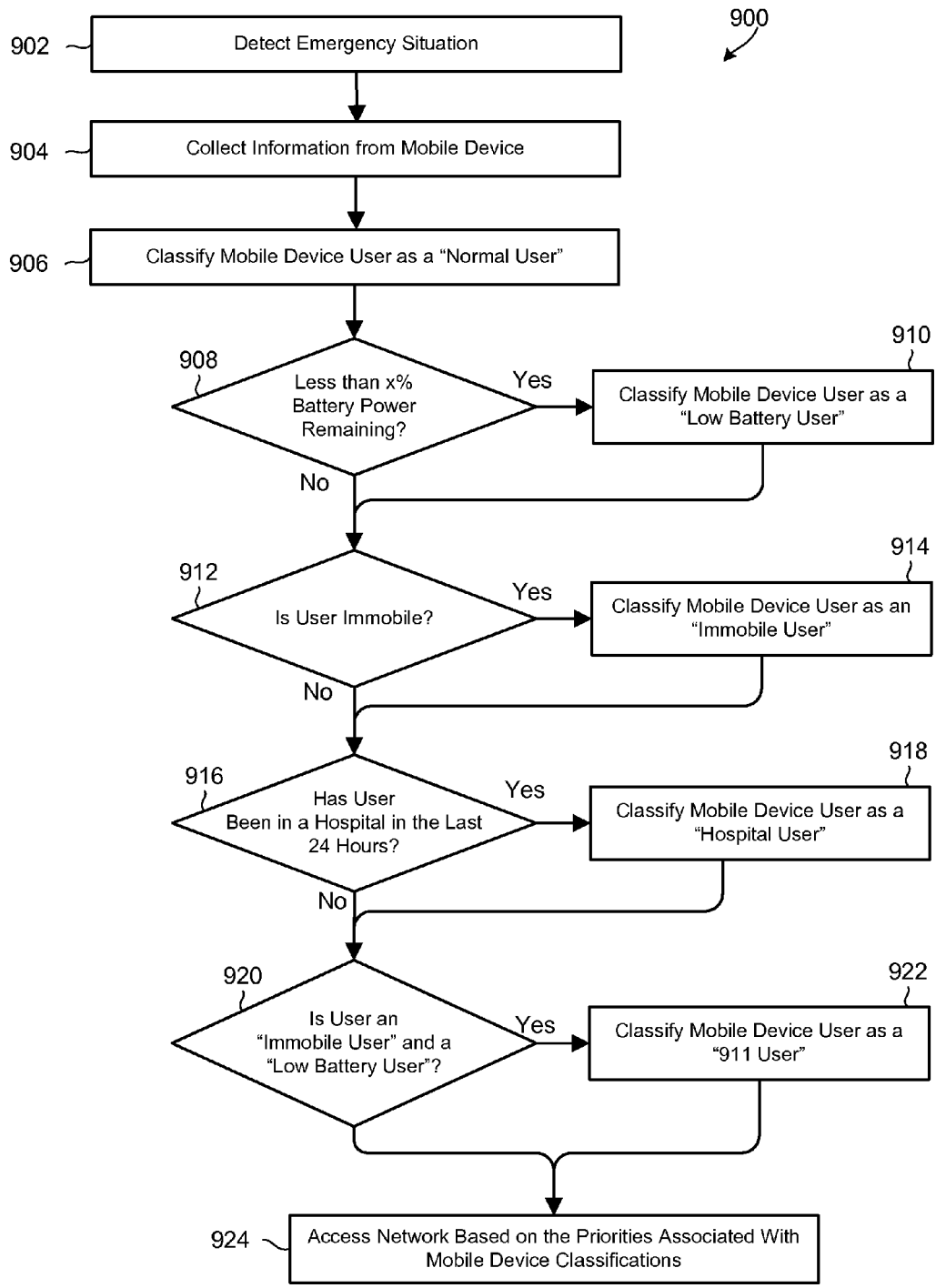
FIG. 9 is a process flow diagram illustrating an embodiment mobile device method for assigning priorities and/or access rights by organizing the mobile device users into groups based on information collected from the mobile device.

FIG. 9 illustrates an embodiment mobile device method 900 for assigning priorities and/or access rights by organizing the mobile device users into groups based on information collected on each mobile device. The operations of method 900 may be performed by a processor of a mobile device, such as a CPU, a wireless modem processor, or both. In block 902, a mobile device may detect the existence of an emergency situation and launch the "emergency mode" application. In block 904, the processor may collect situation information (e.g., from a GPS receiver, contacts lists, accelerometers, etc.) during the emergency. In block 906, the processor may classify the mobile device user as a "Normal User." In determination block 908, the processor may determine whether the amount of battery charge remaining is less than a predetermined threshold value (e.g., 5%). If the processor determines that the amount of battery charge remaining on the device is less than the threshold value (i.e., determination block 908="Yes"), in block 910, the processor may classify the mobile device user as a "low battery user."

In determination block 912, the processor may determine whether the user is stuck in an elevator and/or is otherwise immobile (as may be determined from information collected from accelerometers and other sensors). If the processor determines that the user is immobile (i.e., determination block 912="Yes"), in block 914, the processor may classify the user as an "immobile user."

In determination block 916, the processor may determine whether the user is in a hospital (such as based on GPS coordinates compared to a map or table stored in memory), has recently visited a hospital, and/or has recently tried to call medical personnel (e.g., a dialed number matches that of a doctor, a hospital, "911," etc.). If the processor determines that the user has been to a hospital or tried to call medical personnel recently (i.e., determination block 916="Yes"), in block 918, the processor may classify the user as a "hospital user."

In blocks 920 and 922, the above mentioned classifications may be used in combination to generate additional categories or to place the mobile device users in a different category. For example, in determination block 920, the processor may determine whether the user is both a "low battery user" and an "immobile user," or both a "low battery user" and a "hospital user." If the processor determines that the user matches both categories (i.e., determination block 920="Yes"), in block 922, the processor may classify the user as a "911 user." The result of these self-classifications may then be used by the mobile device processor to determine call windows or otherwise access the network according to priorities and a pseudorandom number in block 924.

It should be understood that other classifications may be used instead of, or in addition to, the classifications discussed above and illustrated in FIG. 9. For example, in an embodiment, the processor may also determine whether the user has high signal strength and classify the user as a "high signal strength user." These additional classifications may be used with the above mentioned classifications to generate additional categories (or to place the mobile device users in a different category) in, for example, blocks 920 and 922. For example, the mobile device processor may allocate two minutes of talk time to the "normal users," whereas "immobile" and "hospital emergency" users may be given an extra two minutes of talk time, and "911 users" may be given unrestricted accesses to the network until they successfully connect a call. As another example, "normal users" may be allocated a small duration whereas "immobile" and/or "hospital emergency" users may be allocated longer or more frequent durations. As yet another example, if the mobile device processor determines that the user is a "911 user," an "immobile user," or "low battery user," the processor may enable automatic redialing to help the user in case he/she drops the call before the time limit reached.

In an embodiment, a network server may be configured determine the priorities and organize the mobile device users into groups using methods similar to method 900 described above. For example, the information collected from mobile device may be sent to the network server, and the operations of blocks 906-922 may be performed by the network server. The network server may be configured to determine the priorities and/or access rights of the mobile device based on the groups to which the mobile device user belongs. For example, the network server may allocate two minutes of talk time to the "normal users," whereas "immobile" and "hospital emergency" users may be given an extra two minutes of talk time, and "911 users" may be given unrestricted accesses to the network until they successfully connect a call. The network server may then push the device classifications to the mobile device 302 for enforcement, or use the device classifications when assigning call priorities and/or assigning call windows to individual mobile devices.

In an embodiment, each mobile device may be placed in a "priority queue" based on the classifications (e.g., normal user, high signal strength user, etc.) or groups to which the mobile device user belongs. The priority queue may be maintained by the mobile device and/or by the network server. The priority queue may be organized such that certain groups of users are given priority over others. In an embodiment, the priority queue may be organized such that "911 users" are given priority access over all others, followed by immobile users, low battery users, hospital emergency users, users who have sent an email, high signal strength users, pay-to-play users, and normal users.

Figure 10:
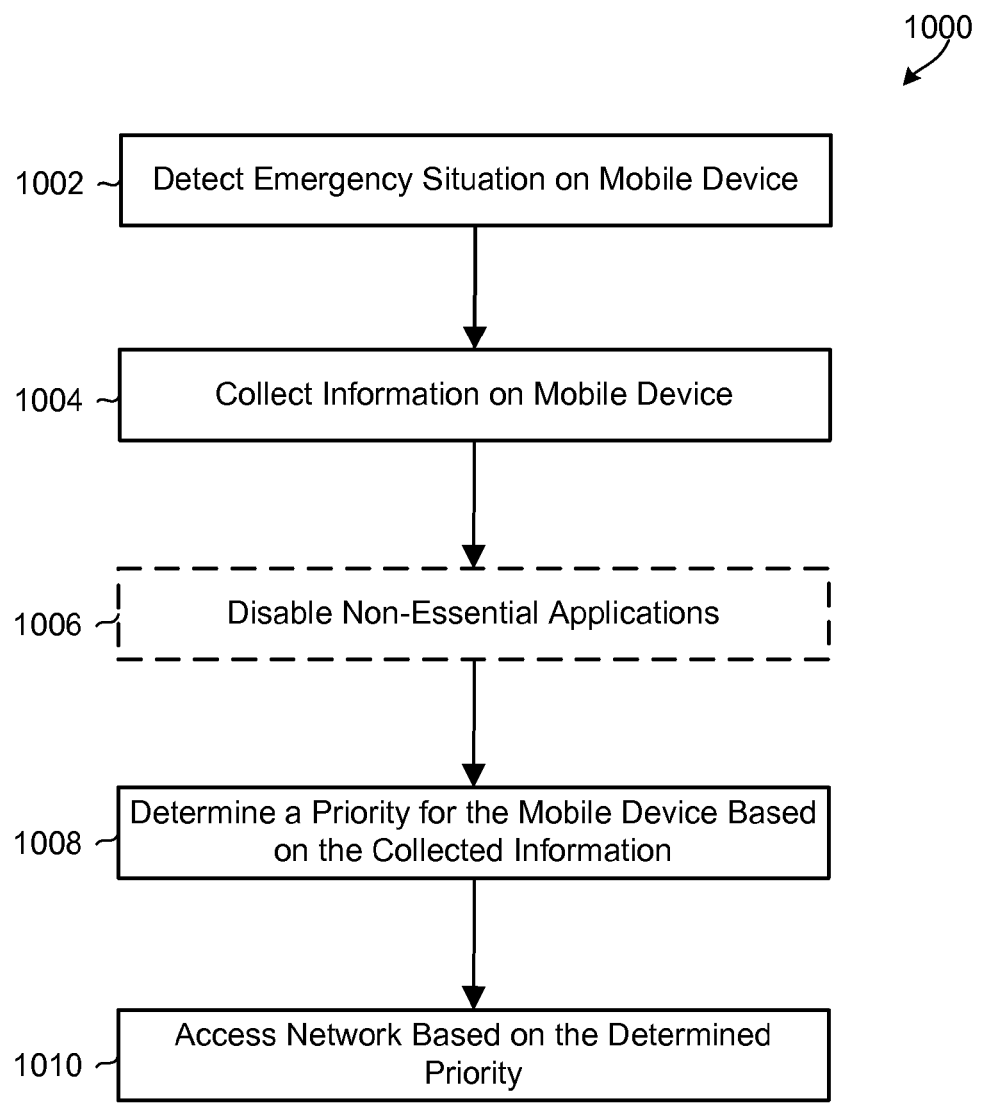
FIG. 10 is a process flow diagram illustrating an embodiment mobile device method for prioritizing access to a telecommunications network during an emergency.

FIG. 10 illustrates an embodiment mobile device method 1000 for accessing a telecommunications network during an emergency. The operations of method 1000 may be performed by a processor of a mobile device, such as a CPU, a wireless modem processor, or both. In block 1002, the mobile device processor may detect the existence of an emergency situation. In block 1004, the processor may collect situational information on the mobile device, which may include emergency contact information, the amount of battery charge remaining, a base station signal strength, GPS coordinates, accelerometer information, gyroscope information, movement information and other information from sensors (e.g., sound or ambient light levels), call history information, pay-to-play selections, and other information. In block 1006, the processor may disable non-essential applications and background processes in order to reduce power consumption. In block 1008, the processor may determine a call/communication priority for the mobile device based on the collected information. As part of block 1008, the processor may identify one or more groups (e.g., normal user, high signal strength user, low battery user, immobile user, etc.) to which the user belongs based on the collected information. In block 1010, the processor may access the communications network based on the determined priority (e.g., based on the access rights associated with the groups).

Figure 11:
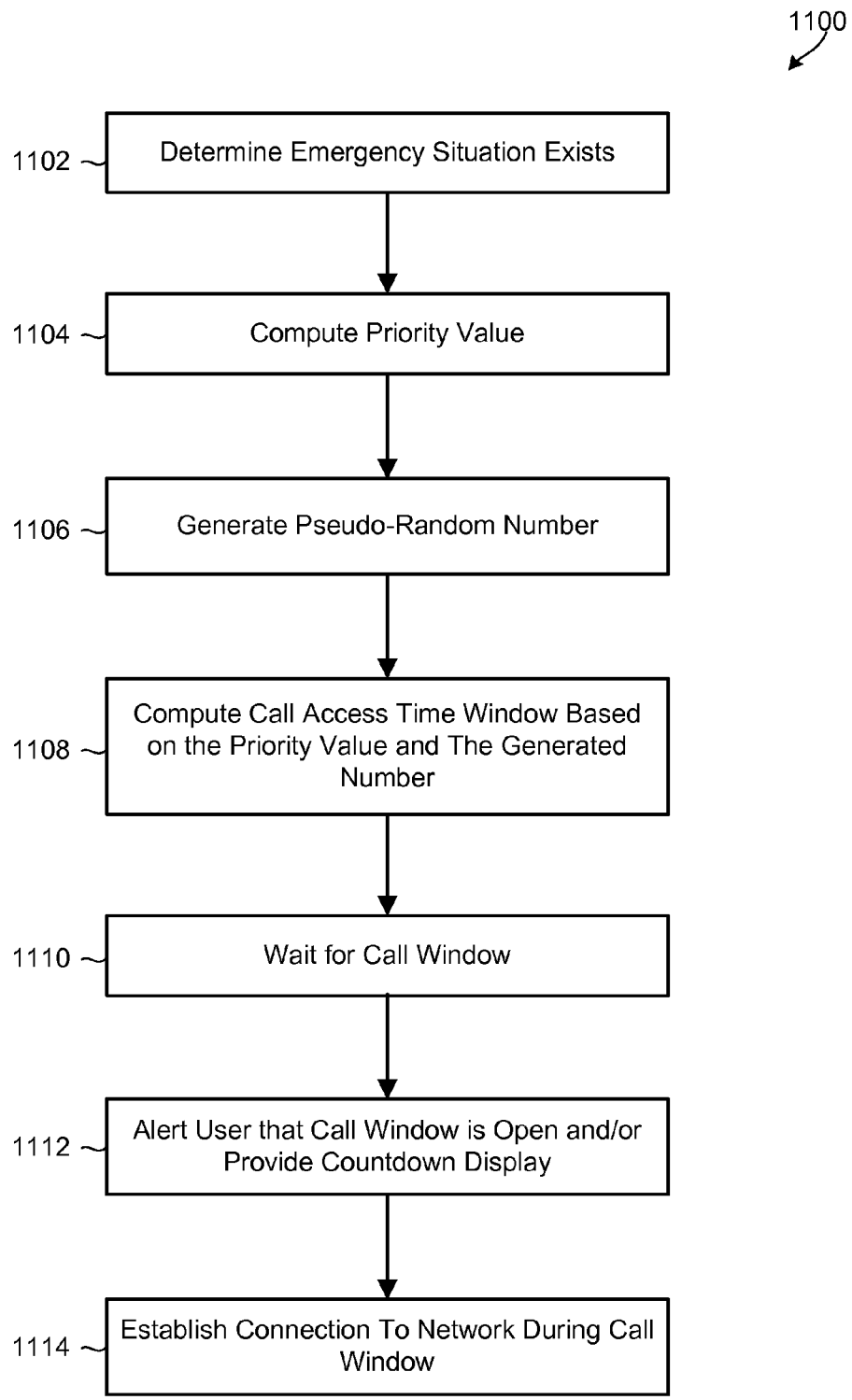
FIG. 11 is a process flow diagram illustrating an embodiment mobile device method for self-determining and self-enforcing priority values to access a communication network.

As discussed above, mobile devices may access the communication network during call windows that may be identified using pseudorandom algorithms in order to autonomously distribute call volume among a large number of mobile devices. FIG. 11 illustrates an embodiment mobile device method 1100 for self-determining and self-enforcing call/communication windows for accessing a communication network. The operations of method 1100 may be performed by a processor of a mobile device, such as a CPU, a wireless modem processor, or both. In block 1102, the processor may determine that an emergency situation exists and launch the emergency mode application. In block 1104, the emergency mode application may compute a priority value for accessing the network on the mobile device using methods described above. The algorithm used by the processor in block 1104 may be configured so that users determined to be most likely in need of help (e.g., based on user inputs or determining the device is immobile based on accelerometer data) or immediate communication access (e.g., experiencing a low battery) may assigned a higher priority value. In block 1106, the processor may compute a pseudorandom number. In block 1108, the processor may compute or identify call/communication time windows during which the mobile device is allowed to access the communication network. For example, the processor may multiply the computed priority value with the pseudo-random number to compute an amount of time and/or a certain point in time in which the mobile device may access the network. Using pseudorandom numbers and a common algorithm for generating call/communication time windows may result in network access attempts being staggered among the mobile devices in the communications network to meter the traffic present on the network at any given time.

In block 1110, the processor may wait for the start of the assigned call window. While waiting, processor may display a countdown indicating the amount of time remaining until the end of the open call window. In block 1112, the mobile device may alert the user that the assigned call window is open and enable communications to take place. In block 1114, the mobile device may establish a connection to the network during the call window, either in response to receiving user input to establish such connections or to perform operations previously stored in a network-task execution queue.

It should be noted that some users may choose to forego communications when informed that an emergency communication exists. Such altruistic choices by individuals will enable more users to connect to the network. Thus, mobile devices may be configured to access the network in block 1114 only in response to a user request.

Figure 12:
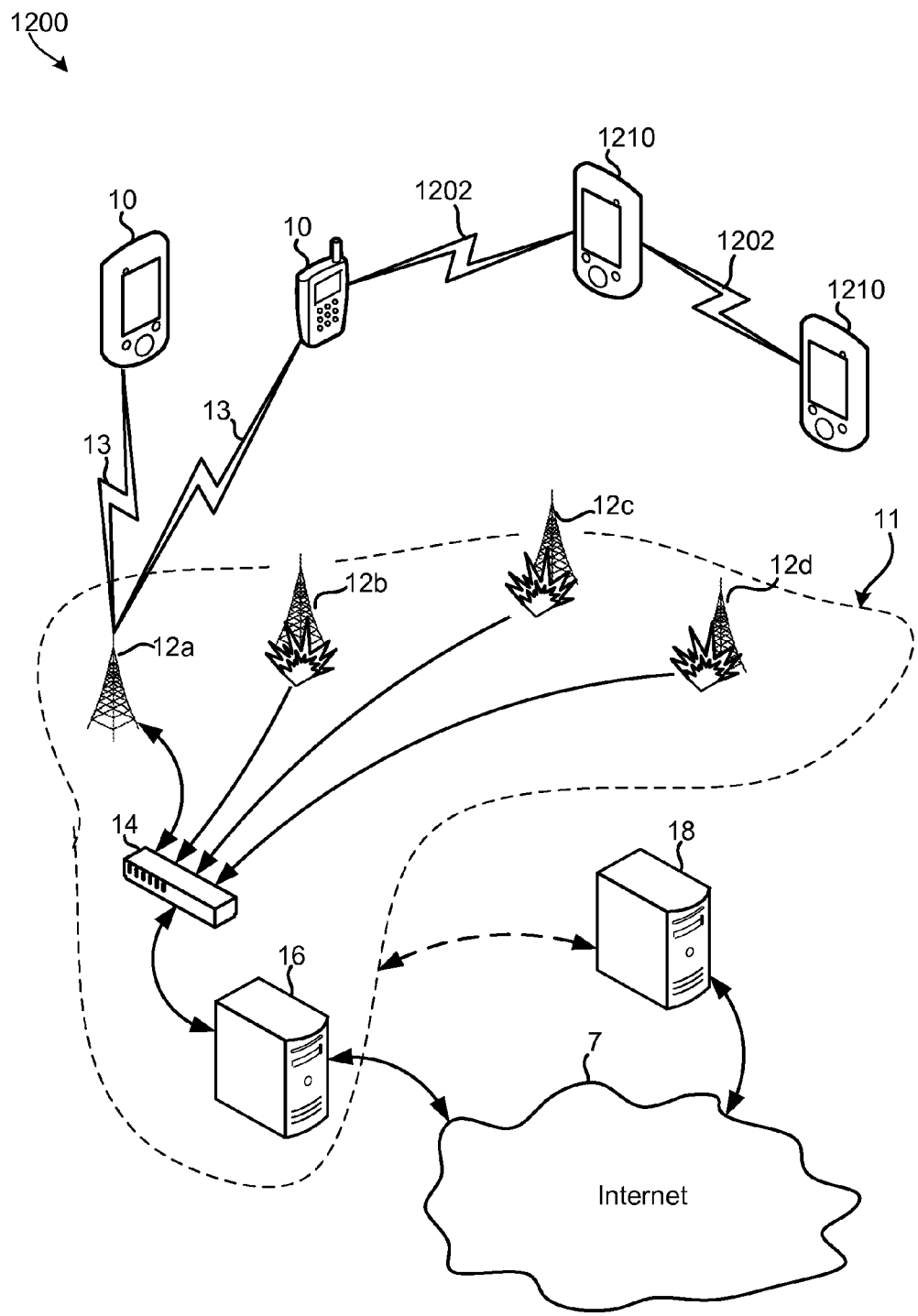
FIG. 12 is a communication system block diagram illustrating network components of an example telecommunication system experiencing an emergency situation in which mobile devices communicate via peer-to-peer and/or short-range wireless radio communication links in accordance with an embodiment.

FIG. 12 illustrates an example communication system 200 in which network resources are damaged as a result of an emergency situation and in which some of the mobile devices 1210 communicate with the telephone network 11 through peer-to-peer and/or short-range wireless radio communication links 1202. The example illustrated in FIG. 12 is similar to the example illustrated in FIG. 2 in that cell base stations 12b, 12c, 12d are damaged and/or inoperable and communications between the mobile devices 10 and the cellular telephone network 11 are accomplished via cell base station 12a. However, the example illustrated in FIG. 12 differs from the example illustrated in FIG. 2 in that mobile devices 1210 not able to establish two-way wireless communication links 13 with the cell base station 12a may establish ad hoc short-range wireless radio communication links 1202 with other mobile devices 1210, 10. Such short-range wireless radio communication links 1202 may be used to communicate information between the connected devices (e.g., the existence or probability of an emergency situation, SMS messages, etc.) and/or to communicate information to the cellular telephone network 11 using the two-way wireless communication links 13 between the mobile devices 10 and the cellular telephone network 11.

Figure 13:
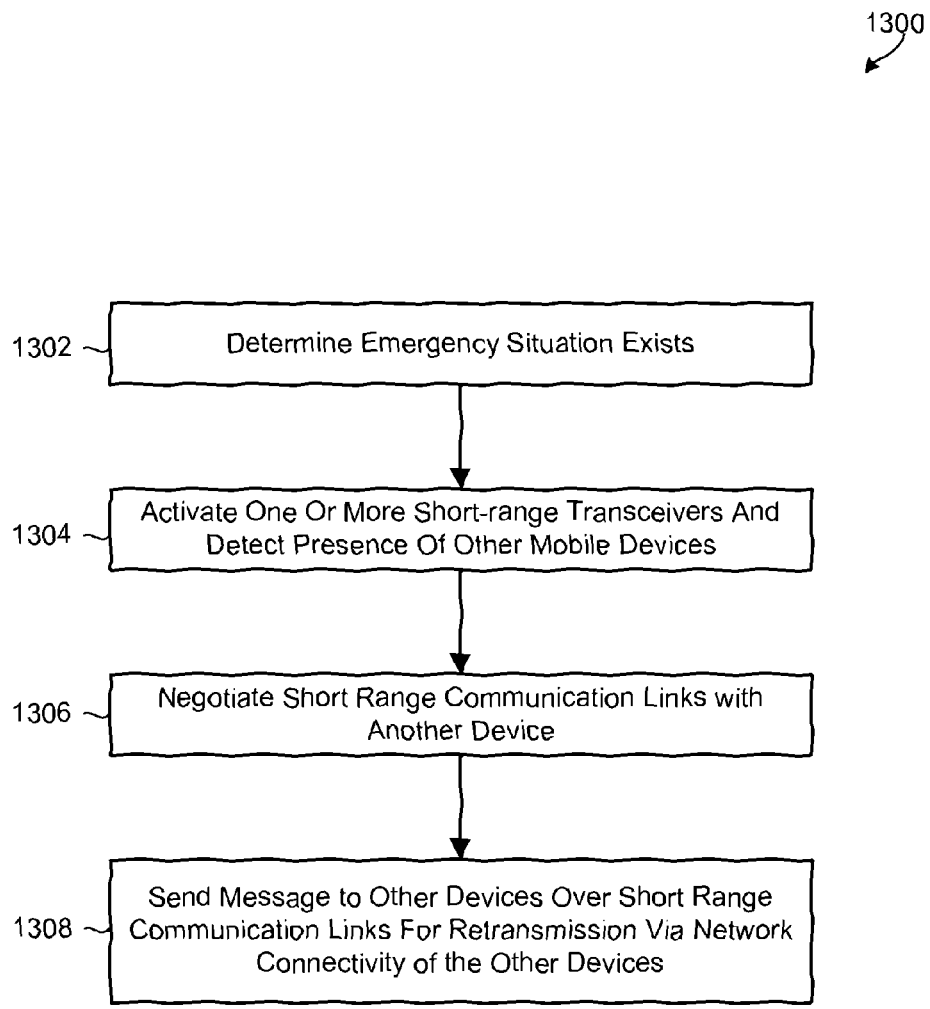
FIG. 13 is a process flow diagram illustrating an embodiment mobile device method for communicating via a communication system over short-range wireless communication links.

FIG. 13 illustrates an embodiment mobile device method 1300 for establishing a connection with a communication system over short-range wireless communication links established with other mobile devices in the communication system. The operations of method 1300 may be performed by a processor of a mobile device, such as a CPU, a wireless modem processor, or both. In block 1302, the mobile device processor may determine that an emergency situation exists. In block 1304, the mobile device may activate one or more short-range radio transceivers (e.g., WiFi, Bluetooth®, etc.) and detect the presence of other mobile devices such as by polling/pinging other mobile devices that within a certain physical distance from the mobile device. In block 1306, the mobile device may negotiate a short-range wireless connection with a detected device. In block 1308, the mobile device may send a message to the detected device over the established short-range wireless connection for retransmission to the communication system via the network connectivity of the detected device. The message may be identified as being a message that is to be retransmitted such as by including information in the message header identifying the message's intended/ultimate destination.

Figure 14:
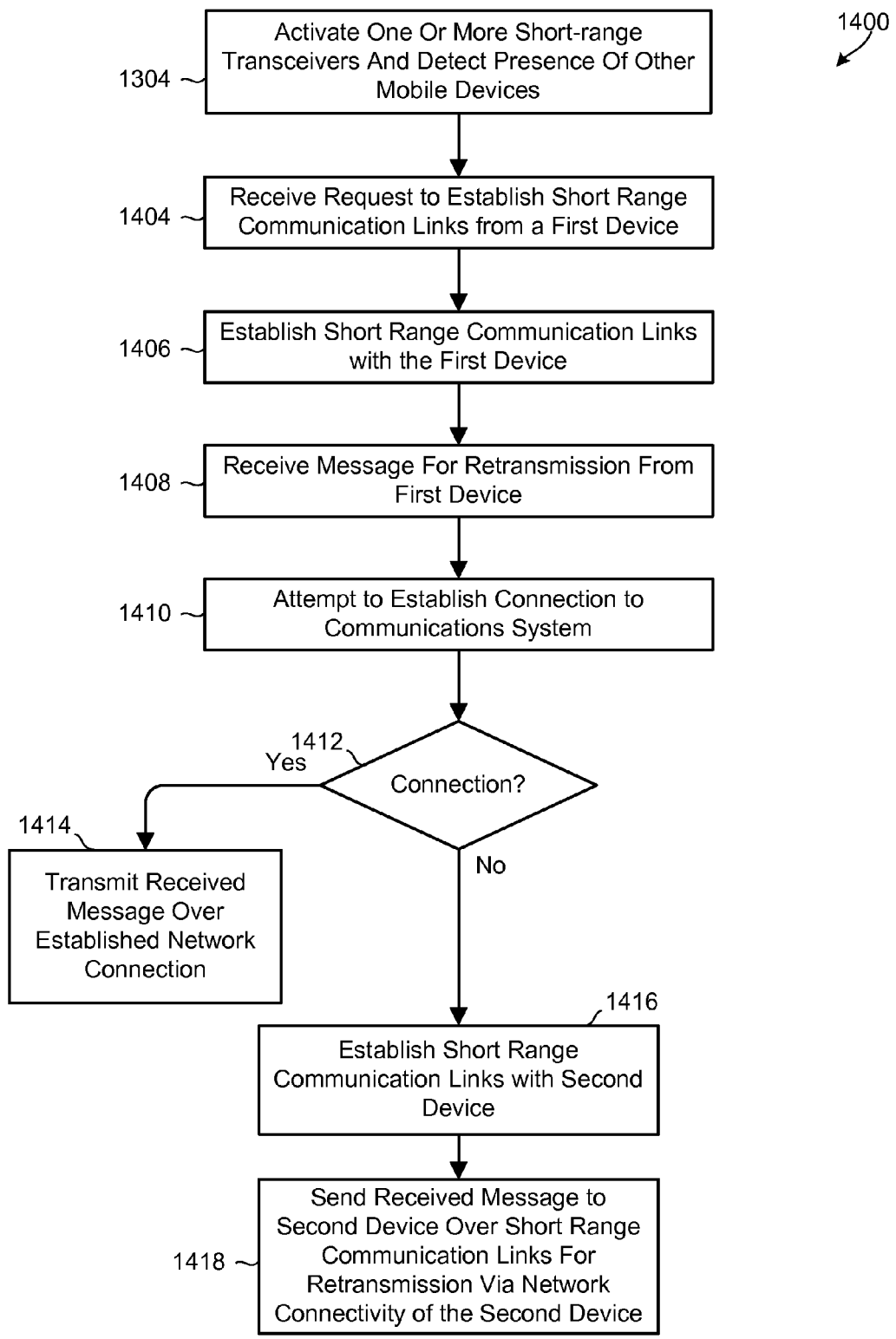
FIG. 14 is a process flow diagram illustrating an embodiment mobile device method for retransmitting messages received over short-range wireless communication links.

FIG. 14 illustrates an embodiment mobile device method 1400 for retransmitting messages received over short-range wireless communication links. The operations of method 1400 may be performed by a processor of a mobile device, such as a CPU, a wireless modem processor, or both. As described above, in block 1304 the mobile device processor may activate one or more short-range wireless transceivers and detect wireless transmissions indicating the presence of other mobile devices. In block 1404, the mobile device may receive a request to establish a short-range wireless communication link with a first mobile device. In block 1404, the mobile device may negotiate short-range wireless communication link with the first mobile device. The negotiation of the short-range wireless communication link may include determining if the mobile device has access/connectivity to a wide area network (WAN) or to the Internet. In block 1408, the mobile device may receive a message marked for retransmission from the first mobile device over the short-range wireless communication link. In block 1410, the mobile device may attempt to establish a connection to the communication system such as by evaluating the allocated time windows/priorities of the device. In determination block 1412, the processor may determine whether communications links were successfully established with the communication system.

If the processor determines that communications links were successfully established with the communication system (i.e., determination block 1412="Yes"), in block 1414, the mobile device may transmit the received message to the communication system over the established network communication links. If the processor determines that communications links were not established with the communication system (i.e., determination block 1412="No"), in block 1416, the mobile device may establish a short-range wireless communication link with a second mobile device. In block 1418, the mobile device may forward the received message to the second mobile device over the established short-range wireless communication link for retransmission to the communication system via the network connectivity of the second device. In an embodiment, as part of block 1418, the mobile device may be configured to add information to the message and/or store information in a mobile device memory so that the mobile device may identify when a potential peer has already re-transmitted the message. In this manner, the mobile devices may prevent the circular transmission of messages over the peer-to-peer communication links.

Figure 15:
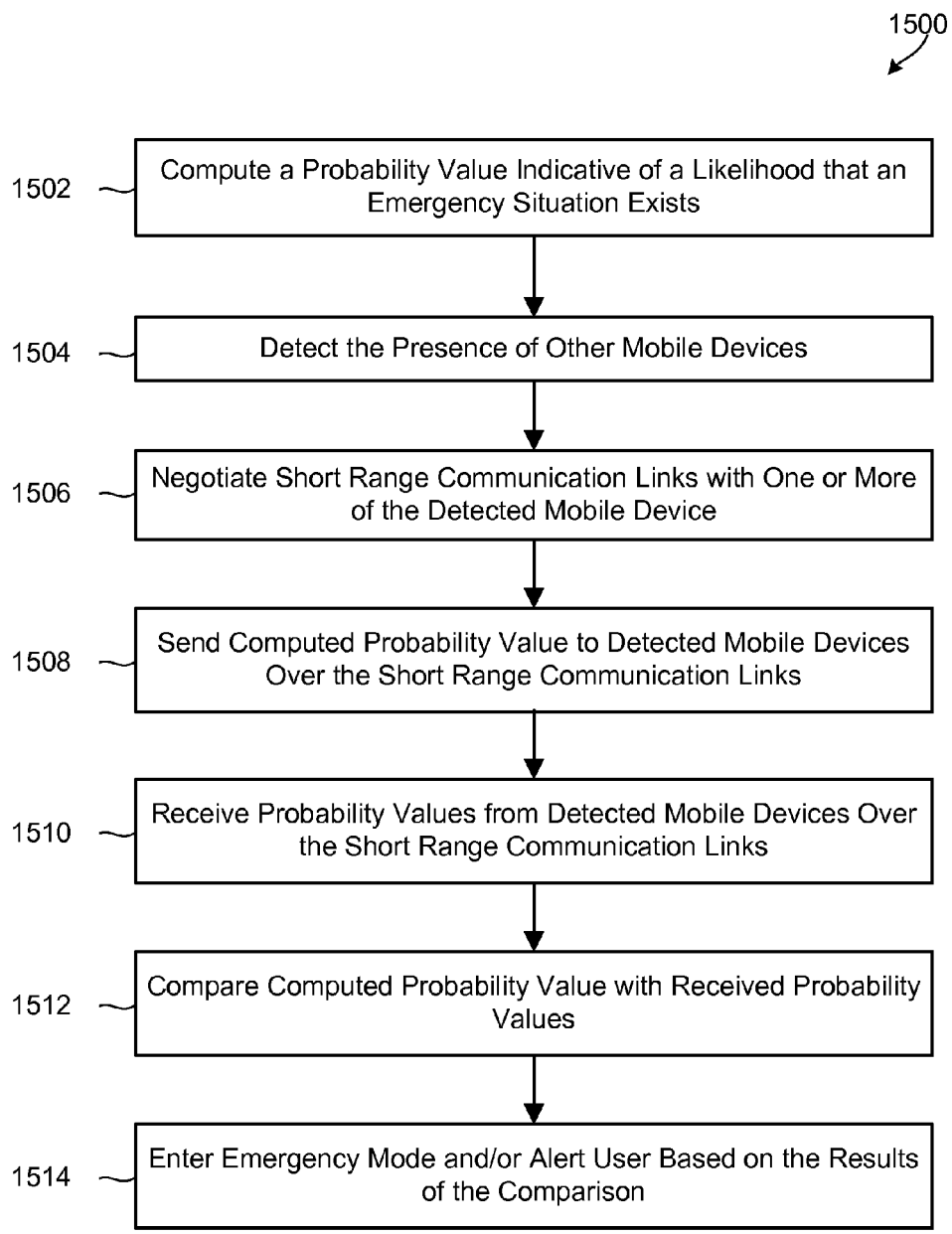
FIG. 15 is a process flow diagram illustrating embodiment mobile device method for determining the existence of an emergency situation based on information received from other mobile devices over peer-to-peer connections.

FIG. 15 illustrates an embodiment mobile device method 1500 for determining the existence of an emergency situation based on information received from other mobile devices over peer-to-peer connections. The operations of method 400 may be performed by a processor of a mobile device, such as a CPU, a wireless modem processor, or both. In block 1502, the mobile device processor may detect conditions suggesting the existence of an emergency (e.g., failed attempts to establish a connection) and compute an emergency probability value reflective of the likelihood that an emergency situation exists. In block 1504, the mobile device may activate one or more short-range transceivers and detect the presence of other mobile devices such as by polling/pinging all mobile devices that within a certain physical distance from the mobile device. In block 1506, the mobile device may negotiate short-range wireless communication links (e.g., WiFi, Bluetooth®, etc.) with one or more of the detected mobile devices. In block 1508, the mobile device may send the computed emergency probability value to the detected mobile devices over the established short-range wireless communication links. In block 1510, the mobile device may receive probability values from the other mobile devices over the established short-range wireless communication links. In block 1512, the mobile device processor may compare its computed probability value with the probability values received from the other mobile devices over the short-range wireless communication links. In block 1514, the mobile device may launch the emergency mode and/or display a prompt based on the results of the comparison.

Various embodiments may include a method of prioritizing mobile device access to a communication network by detecting an emergency situation on a mobile device, collecting information regarding a condition of the mobile device in response to detecting the emergency situation, determining a priority for the mobile device based on the collected information, and accessing the communication network based on the determined priority. The method may also include disabling non-essential mobile device applications in response to detecting the emergency situation. The method may also include executing an emergency mode application on the mobile device in response to detecting an emergency situation, and the operations of collecting information regarding a condition of the mobile device in response to detecting the emergency situation and determining a priority for the mobile device based on the collected information may be performed by the emergency mode application.

In an embodiment, the method may also include determining, in the mobile device, a time window during which the mobile device is allowed to access the communication network based on the determined priority. Determining the time window may include computing a time window using a common algorithm implemented on a plurality of mobile devices in the communication network and configured to generate time windows such that the time windows of mobile devices are pseudo-randomly staggered. Computing the time window using a common algorithm may include computing a pseudorandom number on the mobile device.

In an embodiment, the method may include establishing a peer-to-peer connection with a second mobile device in response to detecting the emergency situation, and accessing the communication network based on the determined priority may include accessing the communication network through the second mobile device via the peer-to-peer connection.

In an embodiment, collecting information regarding a condition of the mobile device in response to detecting the emergency situation may include collecting battery state information. In a further embodiment, the method may include determining whether the battery state information indicates that a charge state of a battery of the mobile device is below a threshold, and automatically halting background processes and dimming an electronic display of the mobile device in response to determining that that the battery charge state is below the threshold.

In an embodiment, detecting an emergency situation on a mobile device may include detecting network congestion conditions.

In an embodiment, collecting information regarding a condition of the mobile device in response to detecting the emergency situation may include collecting emergency contact information, battery state information, network signal strength information, location coordinates, accelerometer information, gyroscope information, and/or call history information.

In an embodiment, determining a priority for the mobile device based on the collected information may include automatically sending the collected information from the mobile device to a network server, receiving the collected information on the network server, processing the received information separately for each base station coverage area, identifying the mobile device as belonging to one or more groups based on the received information, allocating priorities among mobile devices within base station coverage areas based on a combination of the one or more groups and base station availability, sending an allocated priority to the mobile device, and receiving the allocated priority in the mobile device.

In an embodiment, determining a priority for the mobile device based on the collected information may include automatically determining the priority for the mobile device on the mobile device. In an embodiment, the mobile device priority may determined based on the collected information using an algorithm configured to autonomously distribute call time availability among a plurality of mobile devices in the communication network.

In an embodiment, determining a priority for the mobile device based on the collected information and accessing the communication network based on the determined priority may include automatically sending the collected information from the mobile device to a network server, receiving the collected information on the network server, processing the received information separately for each base station coverage area, identifying the mobile device as belonging to one or more groups based on the received information, allocating call windows among mobile devices within base station coverage areas based on a combination of the one or more groups and base station availability, sending an allocated call window to the mobile device, receiving the allocated call window in the mobile device, and accessing the communication network during the allocated call window. In an embodiment, determining a priority for the mobile device based on the collected information may include organizing the mobile device into one or more groups based on the collected information. In an embodiment, accessing the communication network based on the determined priority may include accessing the communication network based on network access rights associated with the one or more groups into which the mobile device is organized.

In an embodiment, detecting an emergency situation on a mobile device may include computing an emergency probability value reflecting a likelihood that an emergency situation exists, and the method may further include displaying the emergency probability value on a display of the mobile device and receiving a user input instructing the mobile device to launch an emergency mode application configured to perform the operations of collecting information on the mobile device, determining a priority for the mobile device based on the collected information, and accessing the communication network based on the determined priority.

In an embodiment, detecting an emergency situation on a mobile device may include determining a current location of the mobile device, measuring a signal strength value on the mobile device, and comparing the measured signal strength value with signal strength values stored in a network coverage map for the determined location.

In an embodiment, detecting an emergency situation on a mobile device may include determining a current location of the mobile device, measuring power consumption associated with establishing a network connection at the current location, and comparing the measured power consumption with historical power consumption values for establishing network connections at the current location.

In an embodiment, detecting an emergency situation on a mobile device may include detecting failed attempts to communicate with a first device via the communication network and determining whether a temporary communication link can be established with a second device. In an embodiment, detecting an emergency situation on a mobile device may include receiving a user input on the mobile device indicating that an emergency situation exits.

In an embodiment, detecting an emergency situation on a mobile device may include computing a first emergency probability value indicative of likelihood that an emergency situation exists, determining whether the first emergency probability value exceeds a threshold value, negotiating short-range wireless communication links with a second mobile device in response to determining the first emergency probability value exceeds the threshold value, receiving a second emergency probability value from the second mobile device, and comparing the first emergency probability value with the second emergency probability value.

Figure 16:
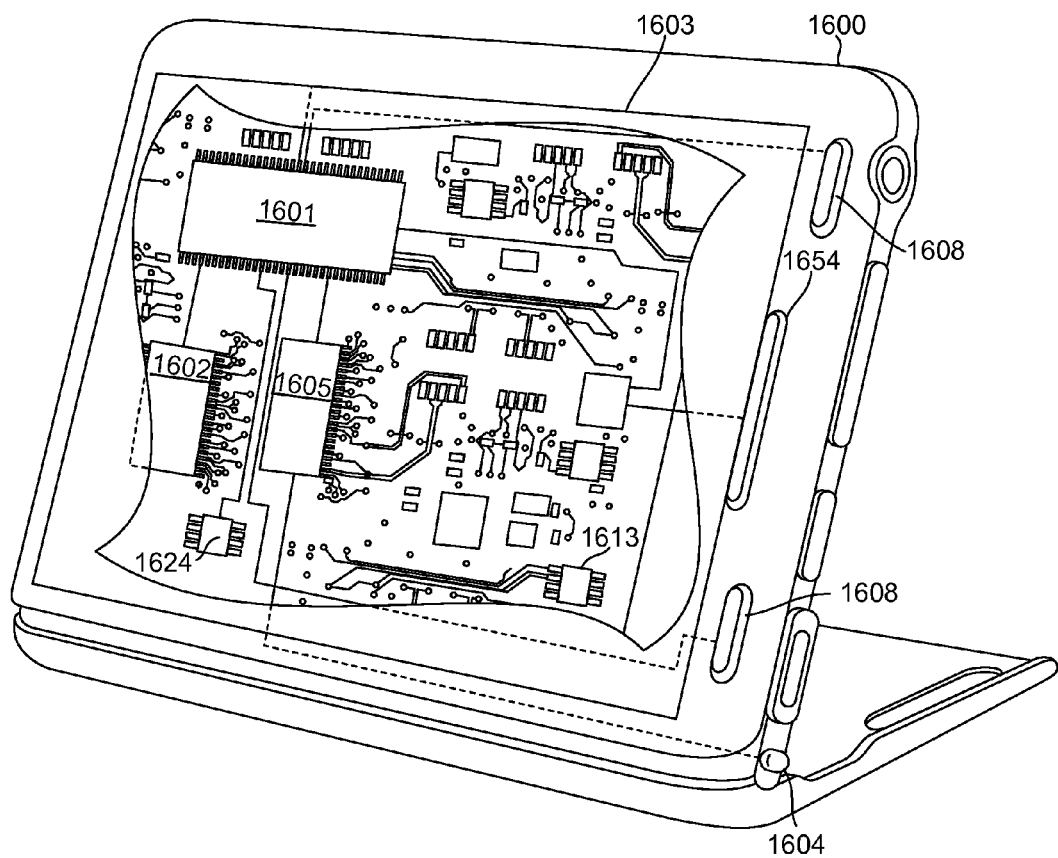
FIG. 16 is a component block diagram of a mobile device suitable for use with an embodiment.

The various embodiments may be implemented on a variety of mobile computing devices, an example of which is illustrated in FIG. 16. Specifically, FIG. 16 is a system block diagram of a mobile transceiver device in the form of a smartphone/cell phone 1600 suitable for use with any of the embodiments. The cell phone 1600 may include a processor 1601 coupled to internal memory 1602, a display 1603, and to a speaker 1654. Additionally, the cell phone 1600 may include an antenna 1604 for sending and receiving electromagnetic radiation that may be connected to a wireless data link and/or cellular telephone transceiver 1605 coupled to the processor 1601. Cell phones 1600 typically also include menu selection buttons or rocker switches 1608 for receiving user inputs.

A typical cell phone 1600 also includes a sound encoding/decoding (CODEC) circuit 1624 which digitizes sound received from a microphone into data packets suitable for wireless transmission and decodes received sound data packets to generate analog signals that are provided to the speaker 1654 to generate sound. Also, one or more of the processor 1601, wireless transceiver 1605 and CODEC 1624 may include a digital signal processor (DSP) circuit (not shown separately). The cell phone 1600 may further include a ZigBee transceiver (i.e., an IEEE 802.15.4 transceiver) 1613 for low-power short-range communications between wireless devices, or other similar communication circuitry (e.g., circuitry implementing the Bluetooth® or WiFi protocols, etc.).

Figure 17:
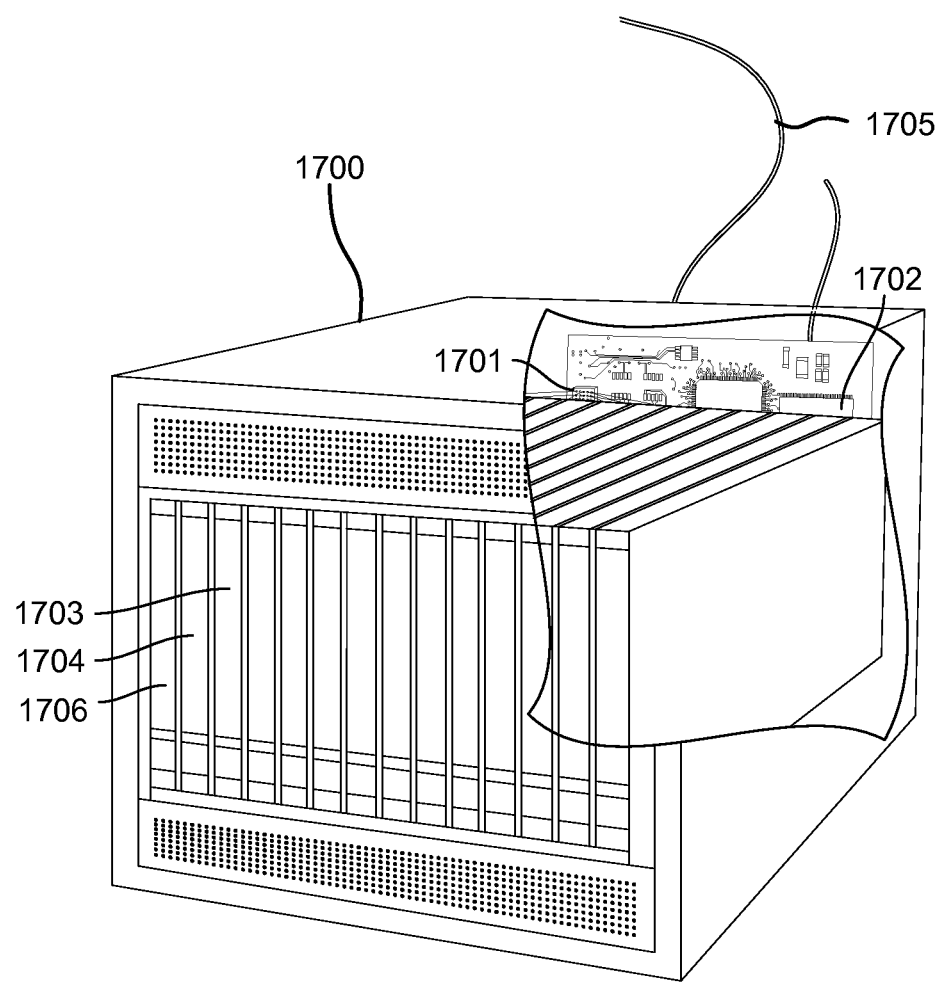
FIG. 17 is a component block diagram of a server suitable for use with an embodiment.

Various embodiments may be implemented on any of a variety of commercially available server devices, such as the server 1700 illustrated in FIG. 17. Such a server 1700 typically includes a processor 1701 coupled to volatile memory 1702 and a large capacity nonvolatile memory, such as a disk drive 1703. The server 1700 may also include a floppy disc drive, compact disc (CD) or DVD disc drive 1706 coupled to the processor 1701. The server 1700 may also include network access ports 1704 coupled to the processor 1701 for establishing data connections with a network 1705, such as a local area network coupled to other communication system computers and servers.

The processors 1601, 1701 may be any programmable microprocessor, microcomputer or multiple processor chip or chips that can be configured by software instructions (applications) to perform a variety of functions, including the functions of the various embodiments described below. In some mobile devices, multiple processors 1701 may be provided, such as one processor dedicated to wireless communication functions and one processor dedicated to running other applications. Typically, software applications may be stored in the internal memory 1602, 1702, 1703 before they are accessed and loaded into the processor 1601, 1701. The processor 1601, 1701 may include internal memory sufficient to store the application software instructions.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for prioritizing mobile device access to a communication network, comprising:
   - detecting an emergency situation on a mobile device;
   - collecting information regarding a condition of the mobile device in response to detecting the emergency situation;
   - determining a priority for the mobile device based on the collected information;
   - determining in the mobile device a time window during which the mobile device is allowed to access the communication network based on the determined priority; and
   - accessing the communication network during the determined time window.

2. The method of claim 1, further comprising:
   - disabling non-essential mobile device applications in response to detecting the emergency situation.

3. The method of claim 1, wherein collecting information regarding a condition of the mobile device in response to detecting the emergency situation comprises collecting battery state information, the method further comprising:
   - determining whether the battery state information indicates that a charge state of a battery of the mobile device is below a threshold; and
   - automatically halting background processes and dimming an electronic display of the mobile device in response to determining that that the battery charge state is below the threshold.

4. The method of claim 1, wherein detecting an emergency situation on a mobile device comprises detecting network congestion conditions.

5. The method of claim 1, wherein collecting information regarding a condition of the mobile device in response to detecting the emergency situation comprises collecting at least one of:
  emergency contact information;
  battery state information;
  network signal strength information;
  location coordinates;
  accelerometer information;
  gyroscope information; and
  call history information.

6. The method of claim 1, wherein determining a priority for the mobile device based on the collected information comprises:
  automatically sending the collected information from the mobile device to a network server;
  receiving the collected information on the network server;
  processing the received information separately for each base station coverage area;
  identifying the mobile device as belonging to one or more groups based on the received information;
  allocating priorities among mobile devices within base station coverage areas based on a combination of the one or more groups and base station availability;
  sending an allocated priority to the mobile device; and
  receiving the allocated priority in the mobile device.

7. The method of claim 1, wherein determining a priority for the mobile device based on the collected information comprises:
  automatically determining the priority for the mobile device based on the collected information using an algorithm configured to autonomously distribute call time availability among a plurality of mobile devices in the communication network.

8. The method of claim 1, further comprising executing an emergency mode application on the mobile device in response to detecting an emergency situation, wherein collecting information regarding a condition of the mobile device in response to detecting the emergency situation and determining a priority for the mobile device based on the collected information are performed by the emergency mode application.

9. The method of claim 1, wherein determining a priority for the mobile device based on the collected information and accessing the communication network during the determined time window comprises:
  automatically sending the collected information from the mobile device to a network server;
  receiving the collected information on the network server;
  processing the received information separately for each base station coverage area;
  identifying the mobile device as belonging to one or more groups based on the received information;
  allocating call windows among mobile devices within base station coverage areas based on a combination of the one or more groups and base station availability;
  sending an allocated call window to the mobile device;
  receiving the allocated call window in the mobile device; and
  accessing the communication network during the allocated call window.

10. The method of claim 1, wherein determining a time window during which the mobile device is allowed to access the communication network comprises computing a time window using a common algorithm implemented on a plurality of mobile devices in the communication network and configured to generate time windows such that the time windows of mobile devices are pseudo-randomly staggered.

11. The method of claim 10, wherein computing a time window using a common algorithm implemented on a plurality of mobile devices in the communication network comprises computing a pseudorandom number on the mobile device, and wherein the common algorithm implemented on mobile devices is configured to allocate time windows for accessing the communication network based on a pseudorandom number generated in each mobile device.

12. The method of claim 1, wherein:
  determining a priority for the mobile device based on the collected information comprises organizing the mobile device into one or more groups based on the collected information; and
  accessing the communication network during the determined time window further comprises accessing the communication network based on network access rights associated with the one or more groups into which the mobile device is organized.

13. The method of claim 1, further comprising establishing a peer-to-peer connection with a second mobile device in response to detecting the emergency situation, wherein accessing the communication network during the determined time window further comprises accessing the communication network through the second mobile device via the peer-to-peer connection.

14. The method of claim 1, wherein detecting an emergency situation on a mobile device comprises computing an emergency probability value reflecting a likelihood that an emergency situation exists, the method further comprising:
  displaying the emergency probability value on a display of the mobile device; and
  receiving a user input instructing the mobile device to launch an emergency mode application, wherein the operations of collecting information on the mobile device, determining a priority for the mobile device based on the collected information, and accessing the communication network during the determined time window are functionalities of the emergency mode application.

15. The method of claim 1, wherein detecting an emergency situation on a mobile device comprises:
  determining a current location of the mobile device;
  measuring a signal strength value on the mobile device; and
  comparing the measured signal strength value with signal strength values stored in a network coverage map for the determined location.

16. The method of claim 1, wherein detecting an emergency situation on a mobile device comprises:
  determining a current location of the mobile device;
  measuring power consumption associated with establishing a network connection at the current location; and
  comparing the measured power consumption with historical power consumption values for establishing network connections at the current location.

17. The method of claim 1, wherein detecting an emergency situation on a mobile device comprises:
  detecting failed attempts to communicate with a first device via the communication network; and
  determining whether a temporary communication link can be established with a second device.

18. The method of claim 1, wherein detecting an emergency situation on a mobile device comprises receiving a user input on the mobile device indicating that an emergency situation exits.

19. The method of claim 1, wherein detecting an emergency situation on a mobile device comprises:
computing a first emergency probability value indicative of likelihood that an emergency situation exists;
determining whether the first emergency probability value exceeds a threshold value;
negotiating short-range wireless communication links with a second mobile device in response to determining the first emergency probability value exceeds the threshold value;
receiving a second emergency probability value from the second mobile device; and
comparing the first emergency probability value with the second emergency probability value.

20. A mobile device, comprising:
means for detecting an emergency situation;
means for collecting information regarding a condition of the mobile device in response to detecting the emergency situation;
means for determining a priority for the mobile device based on the collected information;
means for determining a time window during which the mobile device is allowed to access the communication network based on the determined priority; and
means for accessing a communication network during the determined time window.

21. The mobile device of claim 20, further comprising:
means for disabling non-essential mobile device applications in response to detecting the emergency situation.

22. The mobile device of claim 20, wherein means for collecting information regarding a condition of the mobile device in response to detecting the emergency situation comprises means for collecting battery state information, the mobile device further comprising:
means for determining whether the battery state information indicates that a charge state of a battery of the mobile device is below a threshold; and
means for automatically halting background processes and dimming an electronic display of the mobile device in response to determining that that the battery charge state is below the threshold.

23. The mobile device of claim 20, wherein means for detecting an emergency situation comprises means for detecting network congestion conditions.

24. The mobile device of claim 20, wherein means for collecting information regarding a condition of the mobile device comprises means for collecting at least one of:
emergency contact information;
battery state information;
network signal strength information;
location coordinates;
accelerometer information;
gyroscope information; and
call history information.

25. The mobile device of claim 20, wherein means for determining a priority for the mobile device based on the collected information comprises:
means for automatically sending the collected information to a network server, the collected information including information identifying the mobile device as belonging to one or more groups; and
means for receiving an allocated priority from the network server in response to sending the collected information, the allocated priority having one or more characteristics determined based on a combination of the one or more groups and base station availability.

26. The mobile device of claim 20, wherein means for determining a priority for the mobile device based on the collected information comprises:
means for automatically determining the priority based on the collected information using an algorithm configured to autonomously distribute call time availability among a plurality of mobile devices in the communication network.

27. The mobile device of claim 20, further comprising means for executing an emergency mode application in response to detecting the emergency situation.

28. The mobile device of claim 20, wherein means for determining a priority for the mobile device based on the collected information comprises:
means for automatically sending the collected information to a network server, the collected information identifying the mobile device as belonging to one or more groups; and
means for receiving an allocated call window in response to sending the collected information to the network server, the allocated call window having one or more characteristics determined based on a combination of the one or more groups and base station availability, and wherein means for accessing a communication network during the determined time window comprises accessing the communication network during the allocated call window.

29. The mobile device of claim 20, wherein means for determining a time window during which the mobile device is allowed to access the communication network comprises means for computing the time window using a common algorithm implemented on a plurality of mobile devices in the communication network and configured to generate time windows such that the time windows are pseudorandomly staggered across the plurality of mobile devices.

30. The mobile device of claim 29, wherein means for computing a time window using a common algorithm implemented on a plurality of mobile devices in the communication network and configured to generate time windows such that the time windows are pseudo-randomly staggered across the plurality of mobile devices comprises:
means for computing a pseudorandom number; and
means for generating the time windows based on based on the pseudorandom number.

31. The mobile device of claim 20, wherein:
means for determining a priority for the mobile device based on the collected information comprises means for organizing the mobile device into one or more groups based on the collected information; and
means for accessing the communication network during the determined time window further comprises means for accessing the communication network based on network access rights associated with the one or more groups into which the mobile device is organized.

32. The mobile device of claim 20, further comprising means for establishing a peer-to- peer connection with a second mobile device in response to detecting the emergency situation, wherein means for accessing the communication network during the determined time window further comprises means for accessing the communication network through the second mobile device via the peer-to-peer connection.

33. The mobile device of claim 20, wherein means for detecting an emergency situation comprises means for computing an emergency probability value reflecting a likelihood that an emergency situation exists, the mobile device further comprising:
  means for displaying the emergency probability value on an electronic display of the mobile device; and
  means for receiving a user input instructing the mobile device to launch an emergency mode application.

34. The mobile device of claim 20, wherein means for detecting an emergency situation comprises:
  means for determining a current location of the mobile device;
  means for measuring a signal strength value; and
  means for comparing the measured signal strength value with signal strength values stored in a network coverage map for the determined location.

35. The mobile device of claim 20, wherein means for detecting an emergency situation comprises:
  means for determining a current location of the mobile device;
  means for measuring power consumption associated with establishing a network connection at the current location; and
  means for comparing the measured power consumption with historical power consumption values for establishing network connections at the current location.

36. The mobile device of claim 20, wherein means for detecting an emergency situation comprises:
  means for detecting failed attempts to communicate with a first device via the communication network; and
  means for determining whether a temporary communication link can be established with a second device.

37. The mobile device of claim 20, wherein means for detecting an emergency situation comprises means for receiving a user input indicating that an emergency situation exits.

38. The mobile device of claim 20, wherein means for detecting an emergency situation comprises:
  means for computing a first emergency probability value indicative of likelihood that an emergency situation exists;
  means for determining whether the first emergency probability value exceeds a threshold value;
  means for negotiating short-range wireless communication links with a second mobile device in response to determining the first emergency probability value exceeds the threshold value;
  means for receiving a second emergency probability value from the second mobile device; and
  means for comparing the first emergency probability value with the second emergency probability value.

39. A mobile device, comprising:
  a transceiver;
  a memory; and
  a processor coupled to the transceiver and the memory, wherein the processor is configured with processor-executable instructions to perform operations comprising:
    detecting an emergency situation;
    collecting information regarding a condition of the mobile device in response to detecting the emergency situation;
    determining a priority for the mobile device based on the collected information;
    determining a time window during which the mobile device is allowed to access the communication network based on the determined priority; and
    accessing a communication network during the determined time window.

40. The mobile device of claim 39, wherein the processor is configured with processor-executable instructions to perform operations further comprising:
  disabling non-essential mobile device applications in response to detecting the emergency situation.

41. The mobile device of claim 39,
  wherein the processor is configured with processor-executable instructions such that collecting information regarding a condition of the mobile device in response to detecting the emergency situation comprises collecting battery state information, and
  wherein the processor is configured with processor-executable instructions to perform operations further comprising:
    determining whether the battery state information indicates that a charge state of a battery of the mobile device is below a threshold; and
    automatically halting background processes and dimming an electronic display of the mobile device in response to determining that that the battery charge state is below the threshold.

42. The mobile device of claim 39, wherein the processor is configured with processor-executable instructions such that detecting an emergency situation comprises detecting network congestion conditions.

43. The mobile device of claim 39, wherein the processor is configured with processor-executable instructions such that collecting information regarding a condition of the mobile device comprises collecting at least one of:
  emergency contact information;
  battery state information;
  network signal strength information;
  location coordinates;
  accelerometer information;
  gyroscope information; and
  call history information.

44. The mobile device of claim 39, wherein the processor is configured with processor-executable instructions such that determining a priority for the mobile device based on the collected information comprises:
  automatically sending the collected information to a network server, the collected information including information identifying the mobile device as belonging to one or more groups; and
  receiving an allocated priority from the network server in response to sending the collected information, the allocated priority having one or more characteristics determined based on a combination of the one or more groups and base station availability.

45. The mobile device of claim 39, wherein the processor is configured with processor-executable instructions such that determining a priority for the mobile device based on the collected information comprises:
  automatically determining the priority based on the collected information using an algorithm configured to autonomously distribute call time availability among a plurality of mobile devices in the communication network.

46. The mobile device of claim 39, wherein the processor is configured with processor-executable instructions to perform operations further comprising executing an emergency mode application in response to detecting the emergency situation.

47. The mobile device of claim 39,
  wherein the processor is configured with processor-executable instructions such that determining a priority for the mobile device based on the collected information comprises:

automatically sending the collected information to a network server, the collected information identifying the mobile device as belonging to one or more groups; and receiving an allocated call window in response to sending the collected information to the network server, the allocated call window having one or more characteristics determined based on a combination of the one or more groups and base station availability, and wherein the processor is configured with processor-executable instructions such that accessing a communication network during the determined time window comprises accessing the communication network during the allocated call window.

48. The mobile device of claim 39, wherein the processor is configured with processor-executable instructions such that determining a time window during which the mobile device is allowed to access the communication network comprises:

computing the time window using a common algorithm implemented on a plurality of mobile devices in the communication network and configured to generate time windows such that the time windows are pseudo-randomly staggered across the plurality of mobile devices.

49. The mobile device of claim 48, wherein the processor is configured with processor-executable instructions such that computing a time window using a common algorithm implemented on a plurality of mobile devices in the communication network and configured to generate time windows such that the time windows are pseudo-randomly staggered across the plurality of mobile devices comprises:

computing a pseudorandom number; and
generating the time windows based on based on the pseudorandom number.

50. The mobile device of claim 39, wherein the processor is configured with processor-executable instructions such that:

determining a priority for the mobile device based on the collected information comprises organizing the mobile device into one or more groups based on the collected information; and accessing the communication network during the determined time window further comprises accessing the communication network based on network access rights associated with the one or more groups into which the mobile device is organized.

51. The mobile device of claim 39,
wherein the processor is configured with processor-executable instructions to perform operations further comprising establishing a peer-to-peer connection with a second mobile device in response to detecting the emergency situation, and wherein the processor is configured with processor-executable instructions such that accessing the communication network during the determined time window further comprises accessing the communication network through the second mobile device via the peer-to-peer connection.

52. The mobile device of claim 39,
wherein the processor is configured with processor-executable instructions such that detecting an emergency situation comprises computing an emergency probability value reflecting a likelihood that an emergency situation exists, and wherein the processor is configured with processor-executable instructions to perform operations further comprising:

displaying the emergency probability value on an electronic display of the mobile device; and
receiving a user input instructing the mobile device to launch an emergency mode application.

53. The mobile device of claim 39, wherein the processor is configured with processor-executable instructions such that detecting an emergency situation comprises:

determining a current location of the mobile device;
measuring a signal strength value; and
comparing the measured signal strength value with signal strength values stored in a network coverage map for the determined location.

54. The mobile device of claim 39, wherein the processor is configured with processor-executable instructions such that detecting an emergency situation comprises:

determining a current location of the mobile device;
measuring power consumption associated with establishing a network connection at the current location; and
comparing the measured power consumption with historical power consumption values for establishing network connections at the current location.

55. The mobile device of claim 39, wherein the processor is configured with processor-executable instructions such that detecting an emergency situation comprises:

detecting failed attempts to communicate with a first device via the communication network; and
determining whether a temporary communication link can be established with a second device.

56. The mobile device of claim 39, wherein the processor is configured with processor-executable instructions such that detecting an emergency situation comprises receiving a user input indicating that an emergency situation exits.

57. The mobile device of claim 39, wherein the processor is configured with processor-executable instructions such that detecting an emergency situation comprises:

computing a first emergency probability value indicative of likelihood that an emergency situation exists;
determining whether the first emergency probability value exceeds a threshold value;
negotiating short-range wireless communication links with a second mobile device in response to determining the first emergency probability value exceeds the threshold value;
receiving a second emergency probability value from the second mobile device; and
comparing the first emergency probability value with the second emergency probability value.

58. A non-transitory computer readable storage medium having stored thereon processor-executable software instructions configured to cause a mobile device processor to perform operations for prioritizing mobile device access to a communication network, the operations comprising:

detecting an emergency situation;
collecting information regarding a condition of the mobile device in response to detecting the emergency situation;
determining a priority for the mobile device based on the collected information;
determining a time window during which the mobile device is allowed to access the communication network based on the determined priority; and
accessing the communication network during the determined time window.

59. The non-transitory computer readable storage medium of claim 58, wherein the stored processor-executable software instructions are configured to cause a mobile device processor to perform operations comprising:

disabling non-essential mobile device applications in response to detecting the emergency situation.

60. The non-transitory computer readable storage medium of claim 58,
wherein the stored processor-executable software instructions are configured to cause a mobile device processor to perform operations such that collecting information regarding a condition of the mobile device in response to detecting the emergency situation comprises collecting battery state information, and
wherein the stored processor-executable software instructions are configured to cause a mobile device processor to perform operations comprising:
determining whether the battery state information indicates that a charge state of a battery of the mobile device is below a threshold; and
automatically halting background processes and dimming an electronic display of the mobile device in response to determining that that the battery charge state is below the threshold.

61. The non-transitory computer readable storage medium of claim 58, wherein the stored processor-executable software instructions are configured to cause a mobile device processor to perform operations such that detecting an emergency situation comprises detecting network congestion conditions.

62. The non-transitory computer readable storage medium of claim 58, wherein the stored processor-executable software instructions are configured to cause a mobile device processor to perform operations such that collecting information regarding a condition of the mobile device comprises collecting at least one of:
emergency contact information;
battery state information;
network signal strength information;
location coordinates;
accelerometer information;
gyroscope information; and
call history information.

63. The non-transitory computer readable storage medium of claim 58, wherein the stored processor-executable software instructions are configured to cause a mobile device processor to perform operations such that determining a priority for the mobile device based on the collected information comprises:
automatically sending the collected information to a network server, the collected information including information identifying the mobile device as belonging to one or more groups; and
receiving an allocated priority from the network server in response to sending the collected information, the allocated priority having one or more characteristics determined based on a combination of the one or more groups and base station availability.

64. The non-transitory computer readable storage medium of claim 58, wherein the stored processor-executable software instructions are configured to cause a mobile device processor to perform operations such that determining a priority for the mobile device based on the collected information comprises:
automatically determining the priority based on the collected information using an algorithm configured to autonomously distribute call time availability among a plurality of mobile devices in the communication network.

65. The non-transitory computer readable storage medium of claim 58, wherein the stored processor-executable software instructions are configured to cause a mobile device processor to perform operations comprising executing an emergency mode application in response to detecting the emergency situation.

66. The non-transitory computer readable storage medium of claim 58,
wherein the stored processor-executable software instructions are configured to cause a mobile device processor to perform operations such that determining a priority for the mobile device based on the collected information comprises:
automatically sending the collected information to a network server, the collected information identifying the mobile device as belonging to one or more groups; and
receiving an allocated call window in response to sending the collected information to the network server, the allocated call window having one or more characteristics determined based on a combination of the one or more groups and base station availability, and
wherein the stored processor-executable software instructions are configured to cause a mobile device processor to perform operations such that accessing a communication network during the determined time window comprises accessing the communication network during the allocated call window.

67. The non-transitory computer readable storage medium of claim 58, wherein the stored processor-executable software instructions are configured to cause a mobile device processor to perform operations such that determining a time window during which the mobile device is allowed to access the communication network comprises:
computing the time window using a common algorithm implemented on a plurality of mobile devices in the communication network and configured to generate time windows such that the time windows are pseudo-randomly staggered across the plurality of mobile devices.

68. The non-transitory computer readable storage medium of claim 67, wherein the stored processor-executable software instructions are configured to cause a mobile device processor to perform operations such that computing a time window using a common algorithm implemented on a plurality of mobile devices in the communication network and configured to generate time windows such that the time windows are pseudo-randomly staggered across the plurality of mobile devices comprises:
computing a pseudorandom number; and
generating the time windows based on based on the pseudorandom number.

69. The non-transitory computer readable storage medium of claim 58, wherein the stored processor-executable software instructions are configured to cause a mobile device processor to perform operations such that:
determining a priority for the mobile device based on the collected information comprises organizing the mobile device into one or more groups based on the collected information; and
accessing the communication network during the determined time window further comprises accessing the communication network based on network access rights associated with the one or more groups into which the mobile device is organized.

70. The non-transitory computer readable storage medium of claim 58,
wherein the stored processor-executable software instructions are configured to cause a mobile device processor to perform operations comprising establishing a peer-topeer connection with a second mobile device in response to detecting the emergency situation, and
wherein the stored processor-executable software instructions are configured to cause a mobile device processor to perform operations such that accessing the communication network during the determined time window further comprises accessing the communication network through the second mobile device via the peer-to-peer connection.

71. The non-transitory computer readable storage medium of claim 58,
wherein the stored processor-executable software instructions are configured to cause a mobile device processor to perform operations such that detecting an emergency situation comprises computing an emergency probability value reflecting a likelihood that an emergency situation exists, and
wherein the stored processor-executable software instructions are configured to cause a mobile device processor to perform operations comprising:
displaying the emergency probability value on an electronic display of the mobile device; and
receiving a user input instructing the mobile device to launch an emergency mode application.

72. The non-transitory computer readable storage medium of claim 58, wherein the stored processor-executable software instructions are configured to cause a mobile device processor to perform operations such that detecting an emergency situation comprises:
determining a current location of the mobile device;
measuring a signal strength value; and
comparing the measured signal strength value with signal strength values stored in a network coverage map for the determined location.

73. The non-transitory computer readable storage medium of claim 58, wherein the stored processor-executable software instructions are configured to cause a mobile device processor to perform operations such that detecting an emergency situation comprises:
determining a current location of the mobile device;
measuring power consumption associated with establishing a network connection at the current location; and
comparing the measured power consumption with historical power consumption values for establishing network connections at the current location.

74. The non-transitory computer readable storage medium of claim 58, wherein the stored processor-executable software instructions are configured to cause a mobile device processor to perform operations such that detecting an emergency situation comprises:
detecting failed attempts to communicate with a first device via the communication network; and
determining whether a temporary communication link can be established with a second device.

75. The non-transitory computer readable storage medium of claim 58, wherein the stored processor-executable software instructions are configured to cause a mobile device processor to perform operations such that detecting an emergency situation comprises receiving a user input indicating that an emergency situation exits.

76. The non-transitory computer readable storage medium of claim 58, wherein the stored processor-executable software instructions are configured to cause a mobile device processor to perform operations such that detecting an emergency situation comprises:
computing a first emergency probability value indicative of likelihood that an emergency situation exists;
determining whether the first emergency probability value exceeds a threshold value;
negotiating short-range wireless communication links with a second mobile device in response to determining the first emergency probability value exceeds the threshold value;
receiving a second emergency probability value from the second mobile device; and
comparing the first emergency probability value with the second emergency probability value.

77. A network server, comprising:
means for receiving information regarding a condition of a mobile device in response to the mobile device detecting an emergency situation;
means for processing the received information separately for each base station coverage area;
means for identifying the mobile device as belonging to one or more groups based on the received information;
means for allocating priorities among mobile devices within base station coverage areas based on a combination of the one or more groups and base station availability by generating time windows for a plurality of mobile devices such that the generated time windows are pseudo-randomly staggered and selecting a time window during which the mobile device is allowed to access the communication network from the generated pseudo-randomly staggered time windows; and
means for sending an allocated priority to the mobile device.

78. The network server of claim 77, wherein means for identifying the mobile device as belonging to one or more groups based on the received information comprises means for identifying the mobile device as belonging to one or more groups based on at least one of:
emergency contact information;
battery state information;
network signal strength information;
location coordinates;
accelerometer information;
gyroscope information; and
call history information.

79. The network server of claim 77, wherein means for allocating priorities among mobile devices within base station coverage areas based on a combination of the one or more groups and base station availability further comprises means for allocating call windows among mobile devices within base station coverage areas based on the combination of the one or more groups and base station availability.

80. A network server, comprising:
communications circuitry configured to send and receive communications signals to and from a mobile device;
a memory; and
a server processor coupled to the communications circuitry and the memory, wherein the server processor is configured with server-executable instructions to perform operations comprising:
receiving information regarding a condition of the mobile device in response to the mobile device detecting an emergency situation;
processing the received information separately for each base station coverage area;
identifying the mobile device as belonging to one or more groups based on the received information;
allocating priorities among mobile devices within base station coverage areas based on a combination of the one or more groups and base station availability by generating time windows for a plurality of mobile devices such that the generated time windows are pseudo-randomly staggered and selecting a time window during which the mobile device is allowed to access the communication network from the generated pseudo-randomly staggered time windows; and
sending an allocated priority to the mobile device.

81. The network server of claim 80, wherein the server processor is configured with server-executable instructions such that identifying the mobile device as belonging to one or more groups based on the received information comprises identifying the mobile device as belonging to one or more groups based on at least one of:
emergency contact information;
battery state information;
network signal strength information;
location coordinates;
accelerometer information;
gyroscope information; and
call history information.

82. The network server of claim 80, wherein the server processor is configured with server-executable instructions such that allocating priorities among mobile devices within base station coverage areas based on a combination of the one or more groups and base station availability further comprises allocating call windows among mobile devices within base station coverage areas based on the combination of the one or more groups and base station availability.

83. A non-transitory server readable storage medium having stored thereon server-executable software instructions configured to cause a server processor to perform operations comprising:
receiving information regarding a condition of a mobile device in response to the mobile device detecting an emergency situation;
processing the received information separately for each base station coverage area;
identifying the mobile device as belonging to one or more groups based on the received information;
allocating priorities among mobile devices within base station coverage areas based on a combination of the one or more groups and base station availability by generating time windows for a plurality of mobile devices such that the generated time windows are pseudo-randomly staggered and selecting a time window during which the mobile device is allowed to access the communication network from the generated pseudo-randomly staggered time windows; and
sending an allocated priority to the mobile device.

84. The non-transitory server readable storage medium of claim 83, wherein the stored server-executable software instructions are configured to cause a server processor to perform operations such that identifying the mobile device as belonging to one or more groups based on the received information comprises identifying the mobile device as belonging to one or more groups based on at least one of:
emergency contact information;
battery state information;
network signal strength information;
location coordinates;
accelerometer information;
gyroscope information; and
call history information.

85. The non-transitory server readable storage medium of claim 83, wherein the stored server-executable software instructions are configured to cause a server processor to perform operations such that allocating priorities among mobile devices within base station coverage areas based on a combination of the one or more groups and base station availability further comprises allocating call windows among mobile devices within base station coverage areas based on the combination of the one or more groups and base station availability.

* * * * *